Feb. 22, 1944. R. E. KING ET AL Re. 22,441

TELEPHONE SYSTEM

Original Filed Dec. 1, 1938 18 Sheets-Sheet 1

INVENTORS: R. E. KING
O. R. MILLER
BY M. T. McKenney
ATTORNEY

TELEPHONE SYSTEM

Original Filed Dec. 1, 1938 18 Sheets-Sheet 2

INVENTORS: R. E. KING
O. R. MILLER

BY W. T. McKenney

ATTORNEY

TELEPHONE SYSTEM

Original Filed Dec. 1, 1938 18 Sheets-Sheet 3

INVENTORS: R. E. KING
O. R. MILLER
BY M. T. McFerney
ATTORNEY

Feb. 22, 1944. R. E. KING ET AL Re. 22,441

TELEPHONE SYSTEM

Original Filed Dec. 1, 1938 18 Sheets-Sheet 4

INVENTORS: R.E. KING
O.R. MILLER
BY W.T. McKenney
ATTORNEY

TELEPHONE SYSTEM

Original Filed Dec. 1, 1938 18 Sheets-Sheet 5

INVENTORS: R.E. KING
O.R. MILLER

BY M.T. McKinney

ATTORNEY

Feb. 22, 1944. R. E. KING ET AL Re. 22,441

TELEPHONE SYSTEM

Original Filed Dec. 1, 1938 18 Sheets-Sheet 6

INVENTORS: R. E. KING
O. R. MILLER

BY M. T. McKenney

ATTORNEY

TELEPHONE SYSTEM
Original Filed Dec. 1, 1938 18 Sheets-Sheet 7
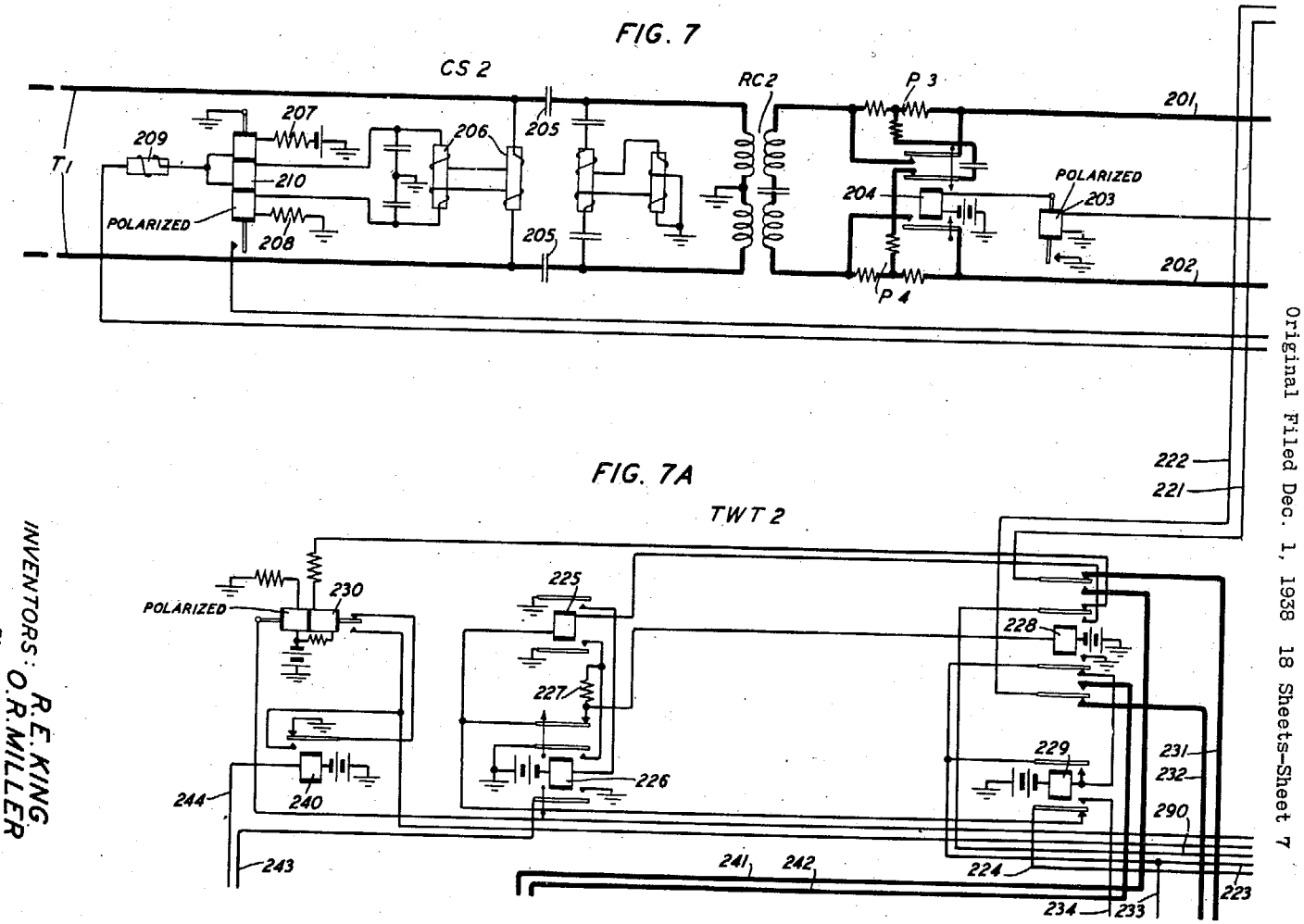
INVENTORS: R. E. KING
O. R. MILLER
BY W. T. McKenney
ATTORNEY Feb. 22, 1944. R. E. KING ET AL Re. 22,441

TELEPHONE SYSTEM

Original Filed Dec. 1, 1938 18 Sheets-Sheet 8

INVENTORS: R.E.KING
O.R.MILLER
BY W.T.McKenney
ATTORNEY

Feb. 22, 1944. R. E. KING ET AL Re. 22,441

TELEPHONE SYSTEM

Original Filed Dec. 1, 1938 18 Sheets-Sheet 9

INVENTORS: R. E. KING
O. R. MILLER
BY M. T. McGinnis
ATTORNEY

Feb. 22, 1944.

R. E. KING ET AL

Re. 22,441

TELEPHONE SYSTEM

Original Filed Dec. 1, 1938 18 Sheets-Sheet 10

INVENTORS: R. E. KING
O. R. MILLER

BY W. C. McKenney

ATTORNEY

Feb. 22, 1944.

R. E. KING ET AL

Re. 22,441

TELEPHONE SYSTEM

Original Filed Dec. 1. 1938 18 Sheets-Sheet 11

INVENTORS: R. E. KING
O. R. MILLER

BY W. P. McKenney

ATTORNEY

Feb. 22, 1944. R. E. KING ET AL Re. 22,441

TELEPHONE SYSTEM

Original Filed Dec. 1, 1938 18 Sheets-Sheet 12

INVENTORS: R.E. KING
O.R. MILLER
BY M.T. McGinnis
ATTORNEY

TELEPHONE SYSTEM

Original Filed Dec. 1, 1938 18 Sheets-Sheet 13

INVENTORS: R.E.KING
O.R.MILLER
BY M.T.McKenney
ATTORNEY

TELEPHONE SYSTEM

Original Filed Dec. 1, 1938 18 Sheets-Sheet 14

INVENTORS: R. E. KING
O. R. MILLER
BY M. T. McKinney
ATTORNEY

Feb. 22, 1944. R. E. KING ET AL Re. 22,441

TELEPHONE SYSTEM

Original Filed Dec. 1, 1938 18 Sheets-Sheet 15

INVENTORS: R. E. KING
O. R. MILLER

BY W. T. McKenney

ATTORNEY

TELEPHONE SYSTEM

Original Filed Dec. 1, 1938 18 Sheets-Sheet 16

INVENTORS: R.E. KING
O.R. MILLER

BY M.T. McKenney

ATTORNEY

TELEPHONE SYSTEM

Original Filed Dec. 1, 1938 18 Sheets-Sheet 17

INVENTORS: R. E. KING
O. R. MILLER
BY M. T. McKenney
ATTORNEY

TELEPHONE SYSTEM

Original Filed Dec. 1, 1938 18 Sheets-Sheet 18

INVENTORS: R.E. KING
O.R. MILLER

BY M.T. McKenney
ATTORNEY

Reissued Feb. 22, 1944

Re. 22,441

UNITED STATES PATENT OFFICE 22,441

TELEPHONE SYSTEM

Ralph E. King, Short Hills, and Ohmer R. Miller, Morristown, N. J., assignors to Bell Telephone Laboratories, Incorporated, New York, N. Y., a corporation of New York Original No. 2,209,777, dated July 30, 1940, Serial No. 243,348, December 1, 1938. Application for reissue July 17, 1942, Serial No. 451,363

26 Claims. (Cl. 179—27)

This system relates to telephone systems and particularly to systems comprising toll offices and automatic switching means for completing toll calls.

It is the object of the invention to minimize the number of manual switching operations involved in establishing toll connections, to expedite the completion of such connections, and to more efficiently and reliably effect the transmission of directive and supervisory signals to and through the automatic switching means employed in completing desired connections.

One of the features of this invention is a telephone system comprising toll offices in which automatic switches are provided for routing incoming calls to called toll and local offices, the talking conductors of one or more of the trunk and selector circuits constituting a simplex circuit for controlling the operation of a relay bridged across one end of these talking conductors, supervisory signals being transmitted from a connected outgoing line or trunk to the incoming line over a non-talking conductor other than the usual sleeve or test conductor. The relay is operated due to an unbalance between the two sides of the simplex circuit when the outgoing line or trunk to which the connection is extended is of such a character as to require that the transmission pads associated with the incoming line be included in the talking circuit. If two lines, each provided with transmission pads, are connected together, the simplex circuit comprising the talking conductors of the connection is used to control the transmission pads of both lines, one relay being bridged across the talking conductors at one end of the simplex and another relay being bridged across the talking conductors at the other end of the simplex.

Another feature of the invention is the provision of a non-talking conductor between an incoming line and a connected outgoing line for transmitting supervisory signals from the outgoing line or trunk to the incoming line in combination with the provision of a simplex circuit over the talking conductors of the connection for transmitting supervisory signals from the incoming line to the outgoing line or trunk, and for controlling the short-circuiting of the transmission pads associated with the incoming line.

Another feature of the invention is a circuit arrangement whereby a calling toll operator, during the completion of a connection from an incoming line to a desired toll operator or local subscriber under the control of the calling operator's dial, will receive a stop-dialing signal whenever the connection is extended to a trunk which is not at the time of seizure ready to receive dial impulses, and will receive a start-dialing signal as soon as dialing may be resumed. According to this feature a toll route selector is arranged to transmit a stop-dialing signal to a calling operator as soon as the brushes are selectively advanced to a group in which each of the trunks is connected to an impulse receiver in response to seizure of the trunk, the stop-dialing signal being continued by the seized trunk circuit until an impulse receiver is associated therewith. In a case where the impulses are being transmitted by a register sender, the stop dial signal can be used to stop the sending of impulses until the stop-dialing signal ends.

According to a further feature, the dial pilot lamp in an operator's dial circuit is arranged to respond to supervisory signals, including a stop-dialing signal, received by the associated outgoing trunk circuit while the dial circuit is connected to the trunk, the disconnection of the dial circuit being effected only upon restoration of the dial key.

Another feature of the invention is the provision, in a toll office comprising selector switches for extending connections from incoming lines to outgoing trunks, including trunks to community dial offices in which impulse responsive apparatus is connected to a trunk as a result of its seizure, and to lines including ring-down toll lines, of supervisory signaling means individual to each selector having access to such trunks and lines for establishing the required signaling and supervisory circuits depending upon the character of a selected line or trunk.

These and other features of the invention will be further explained by considering their application in the telephone system shown schematically in the drawings of this specification. The invention is, however, not limited in its application to the system shown in the drawings and is generally applicable to toll systems comprising selector switches for establishing connections including interoffice trunks.

Referring to the drawings:

Fig. 7 shows a composite signaling circuit CS2 at the other end of intertoll trunk T1;

Fig. 7A shows a two-way trunk circuit TWT2;

Fig. 9 also shows an outgoing trunk circuit OT4 connecting jack J6 to the associated two-way trunk circuit TWT4 and though the composite signaling circuit CS4 to an intertoll trunk T4;

Figure 1:
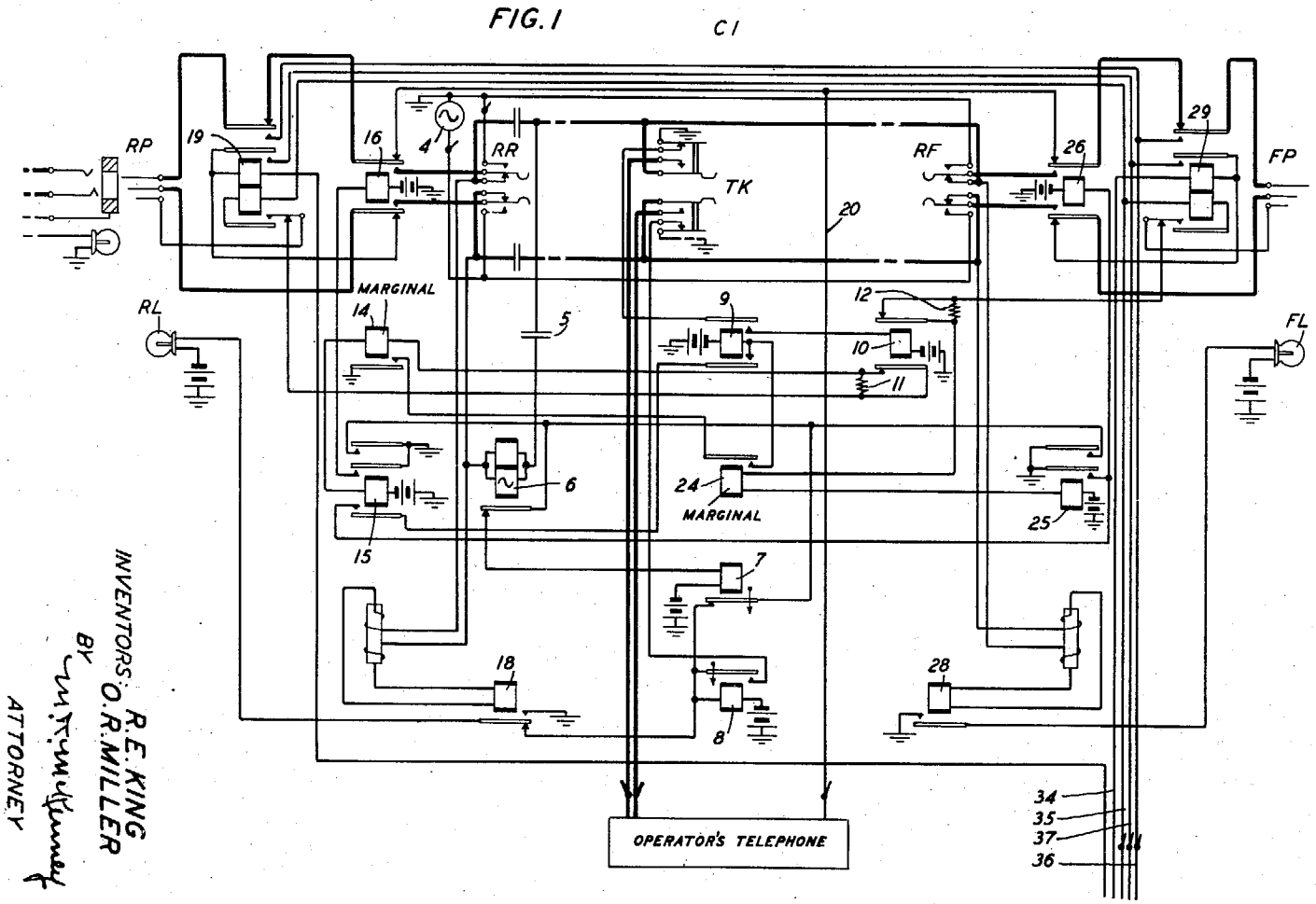
Fig. 1 shows a toll operator's cord C1 and operator's telephone.
Figure 2:
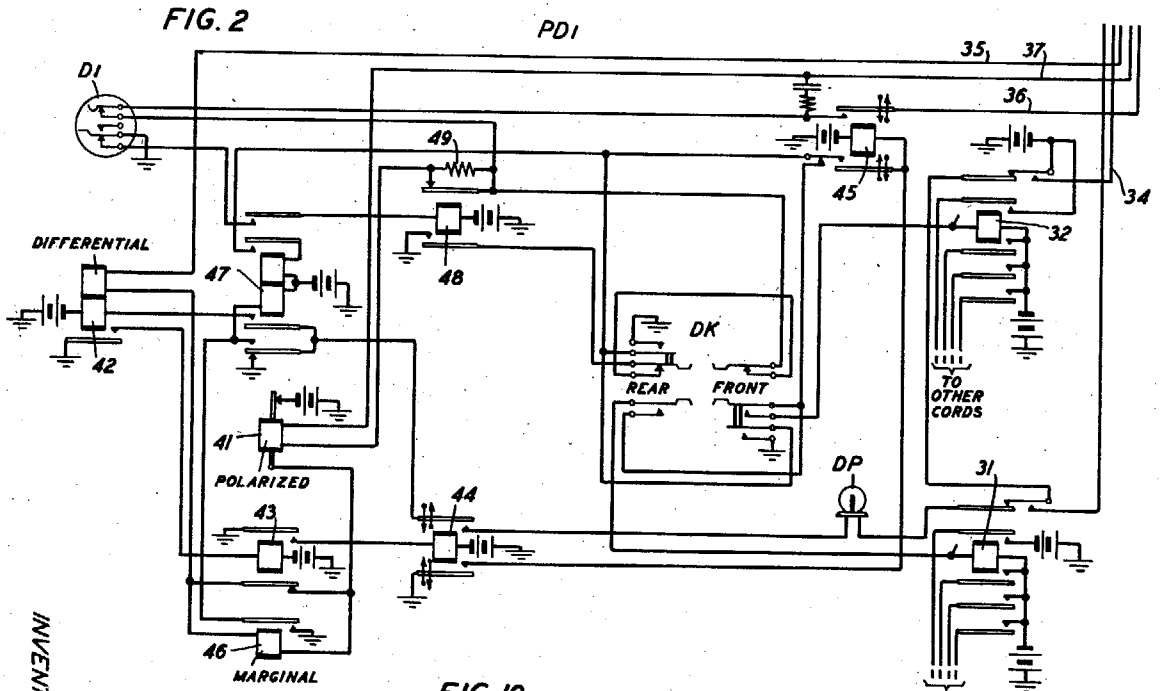
Fig. 2 shows a toll operator's position dial circuit PD1.
Figure 19:
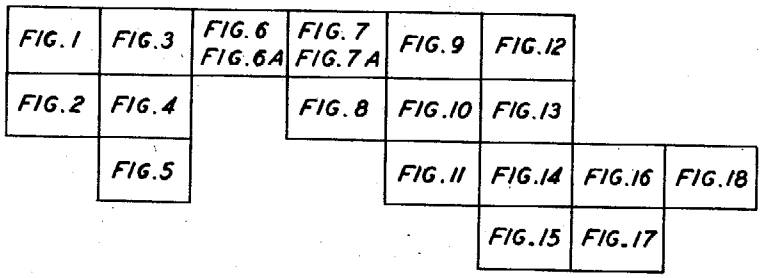
Fig. 19 shows the relative position of each of Figs. 1 to 18, inclusive, to form an intertoll dialing system embodying the features of the invention.
Figure 3:
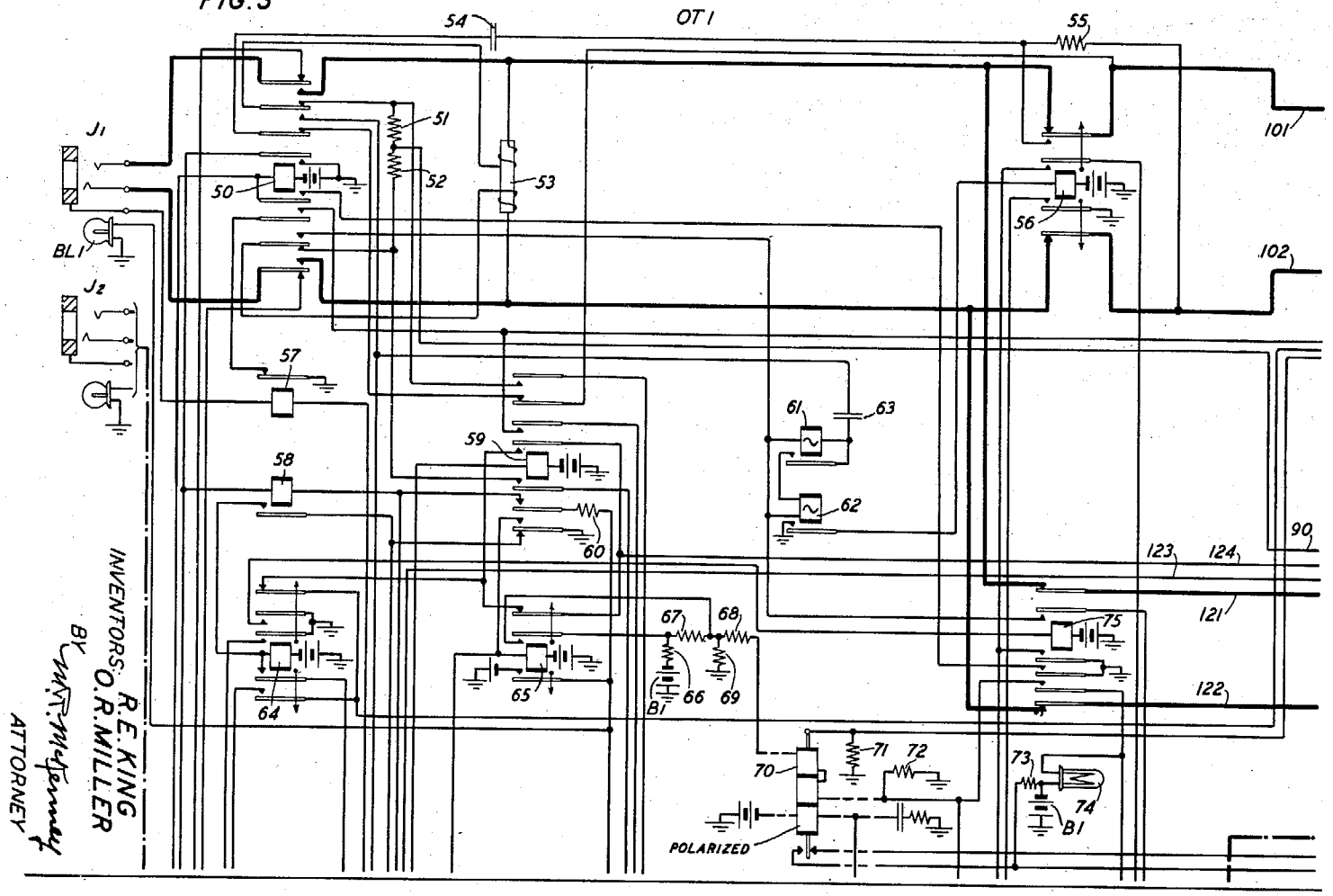
Figs. 3 and 4 show outgoing jacks J1, J2, answering jacks J3, J4, and an outgoing trunk circuit OT1 connected to jack J1.
Figure 4:
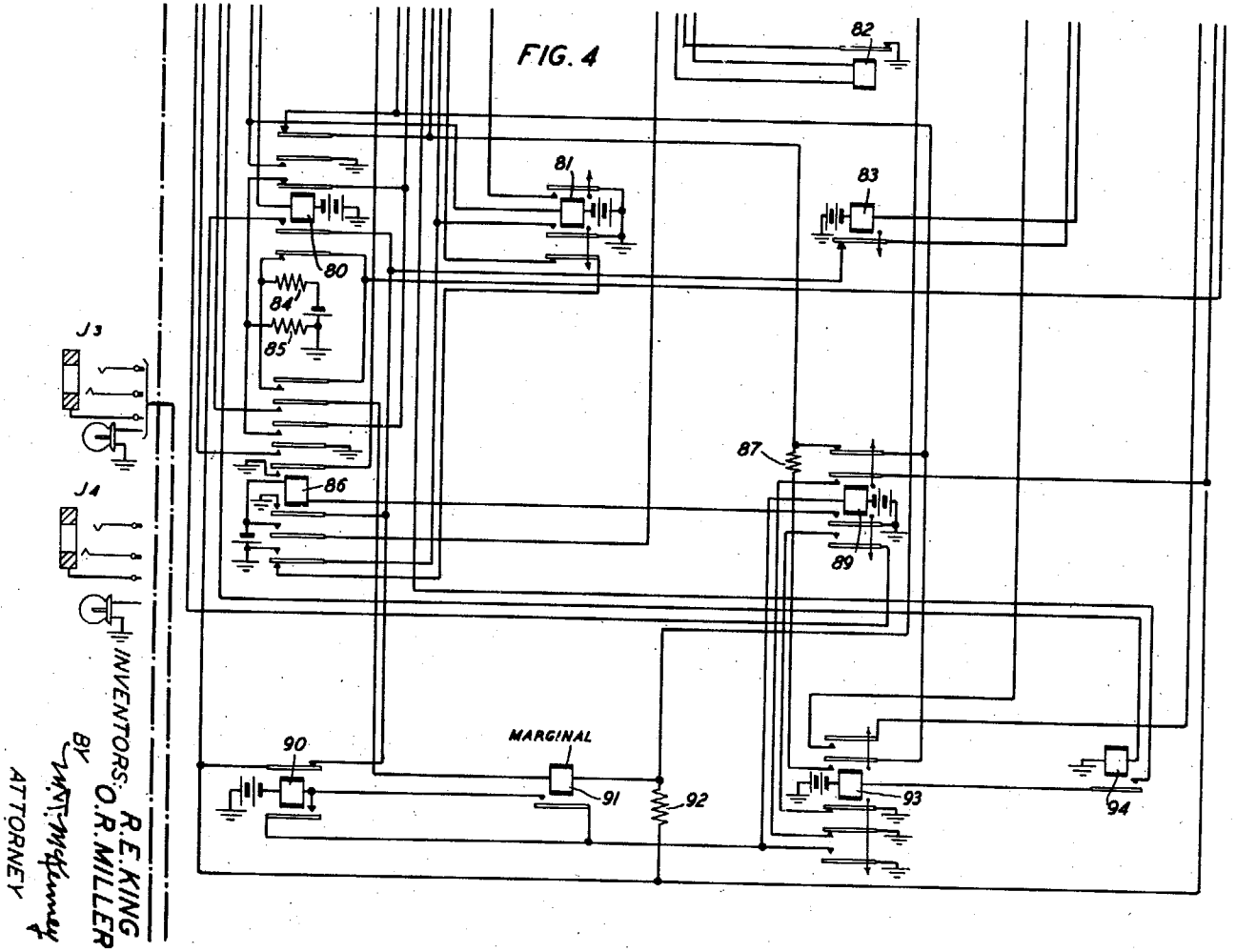
Figure 5:
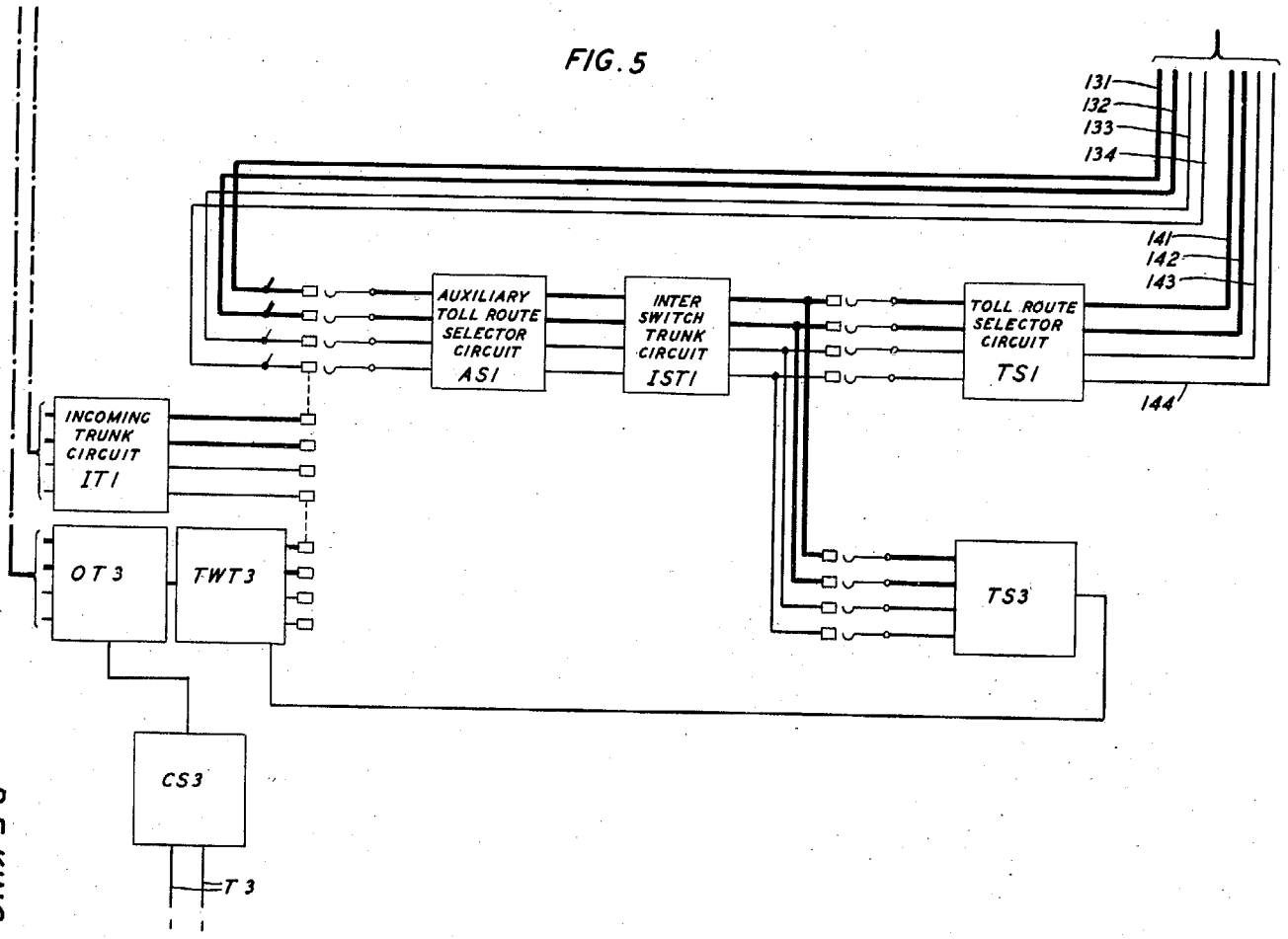
Fig. 5 shows intertoll selectors TS1 and TS3, an interswitch trunk circuit IST1 and an associated auxiliary intertoll selector AS1, an incoming trunk circuit IT1 connected to jack J3 of Fig. 4, an intertoll trunk T3 with its associated composite signaling circuit CS3, two-way trunk circuit TWT3 and outgoing trunk circuit OT3 connected to jack J2 of Fig. 3.
Figure 6:
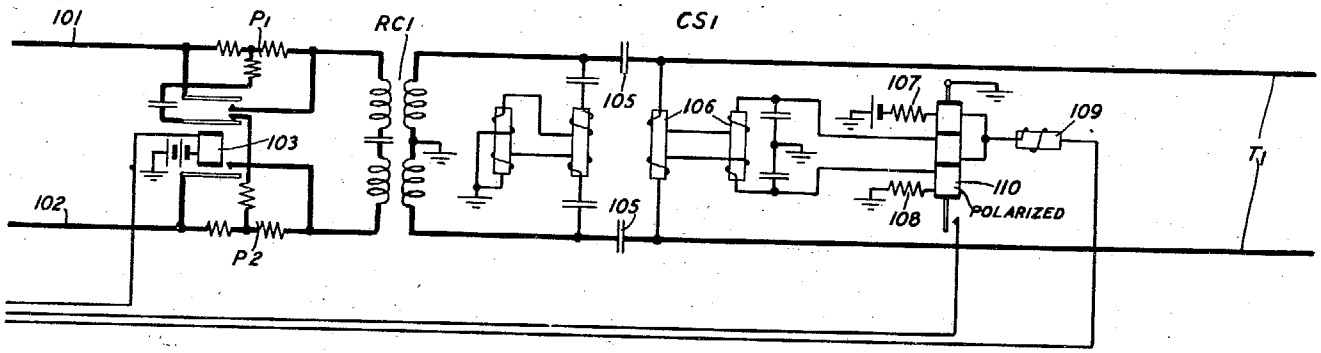
Fig. 6 shows a composite signaling circuit CS1 connecting trunk circuit OT1 of Fig. 3 to one end of intertoll trunk T1.
Figure 6A:
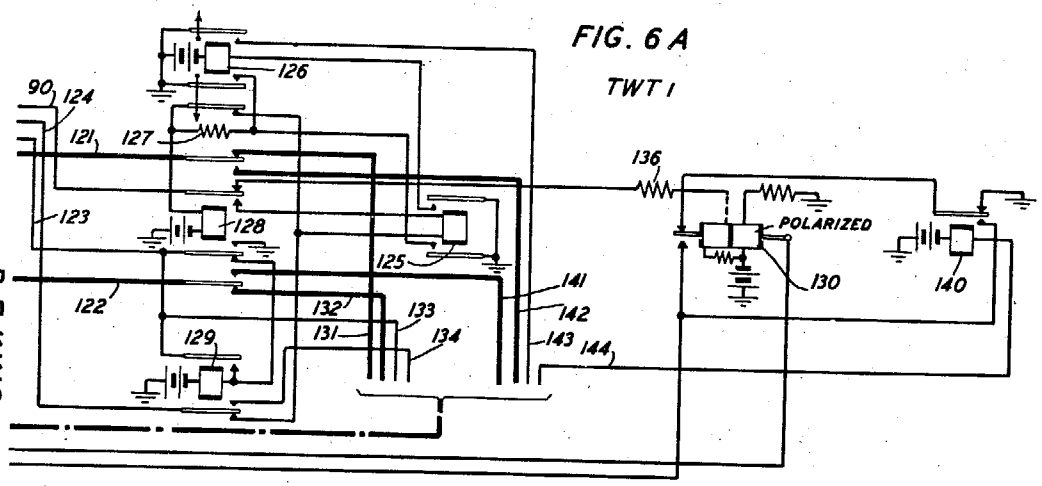
Fig. 6A shows a two-way trunk circuit TWT1 connecting trunk circuit OT1 of Fig. 3 to the toll route selector TS1 of Fig. 5.
Figure 8:
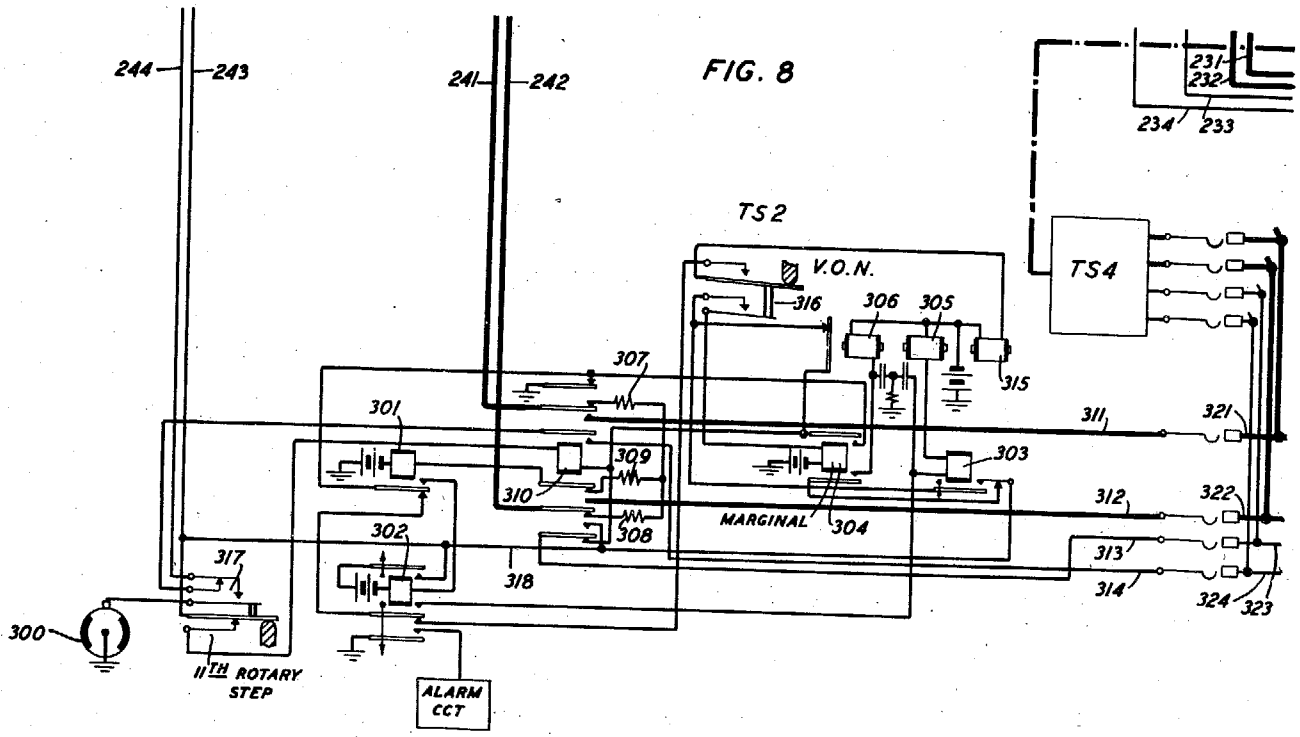
Fig. 8 shows toll route selector TS2 associated with the two-way trunk circuit TWT2 of Fig. 7 and toll route selector TS4 associated with the two-way trunk circuit TWT4 of Fig. 9.
Figure 9:
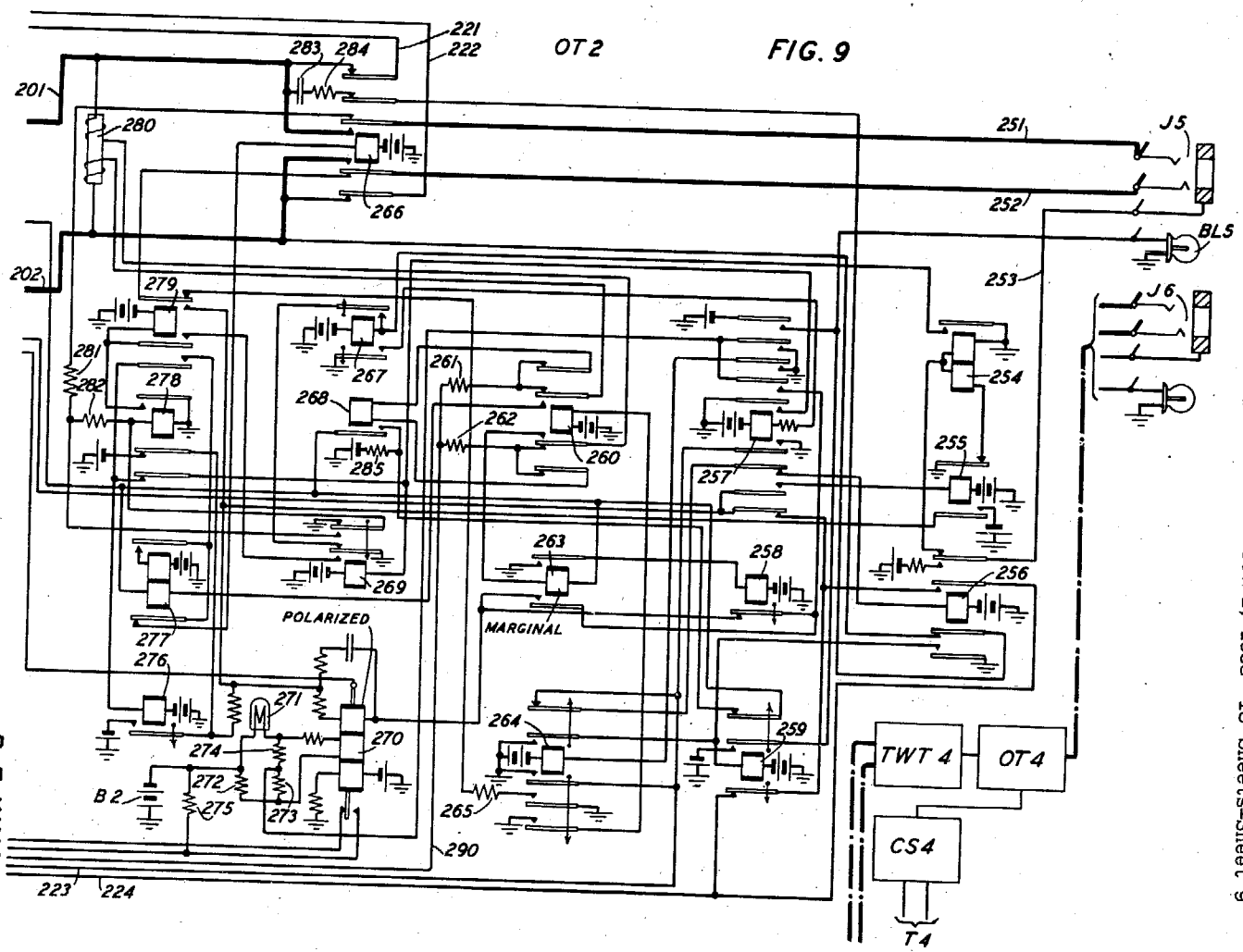
Fig. 9 shows outgoing jacks J5 and J6 and an outgoing trunk circuit OT2 connecting jack J5 to the composite signaling circuit CS2 of Fig. 7 and trunk circuit TWT2 of Fig. 7A.
Figure 10:
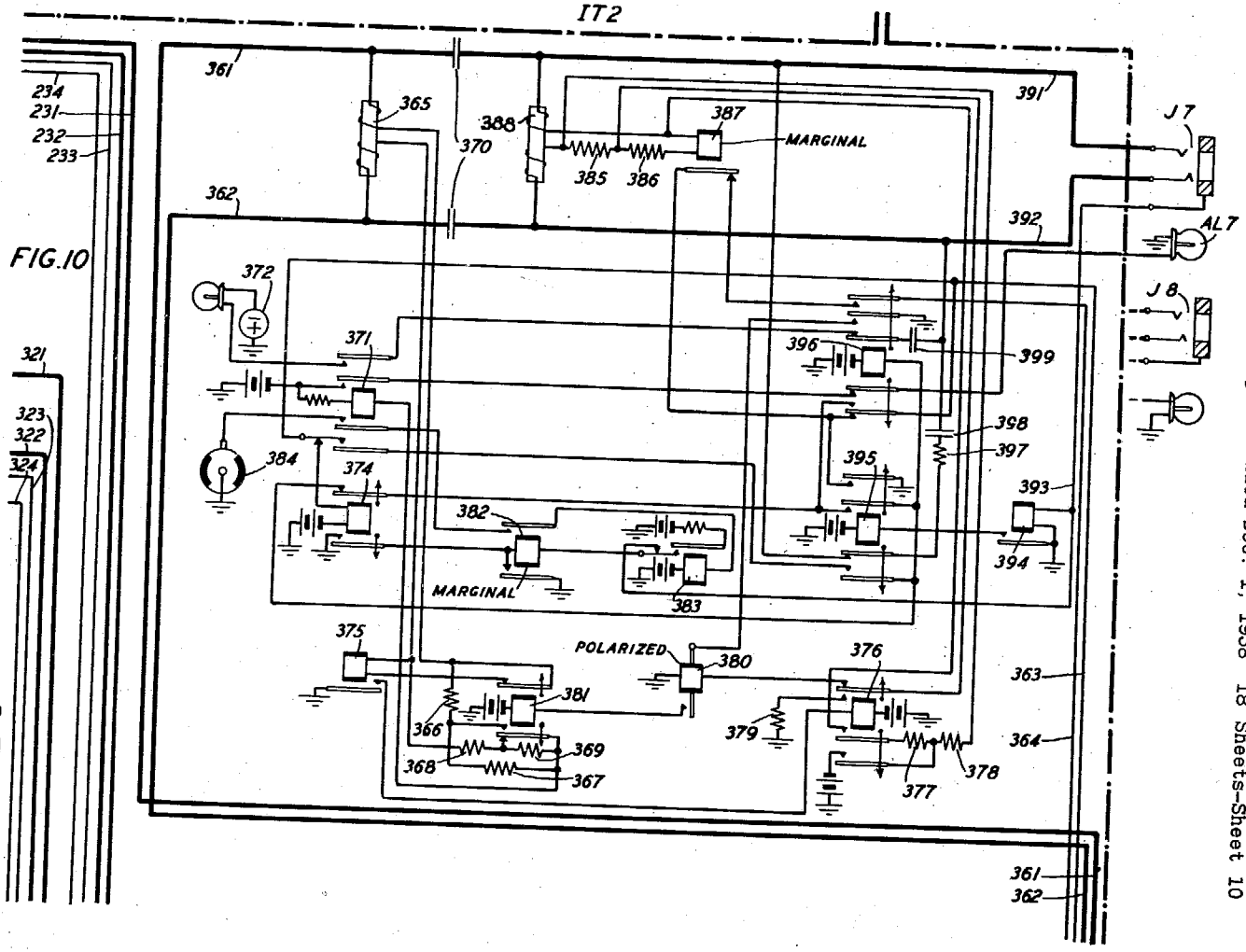
Fig. 10 shows answering jacks J7 and J8, an incoming trunk circuit IT2 connecting jack J7 to a set of terminals in the bank of selector AS2 of Fig. 14.
Figure 11:
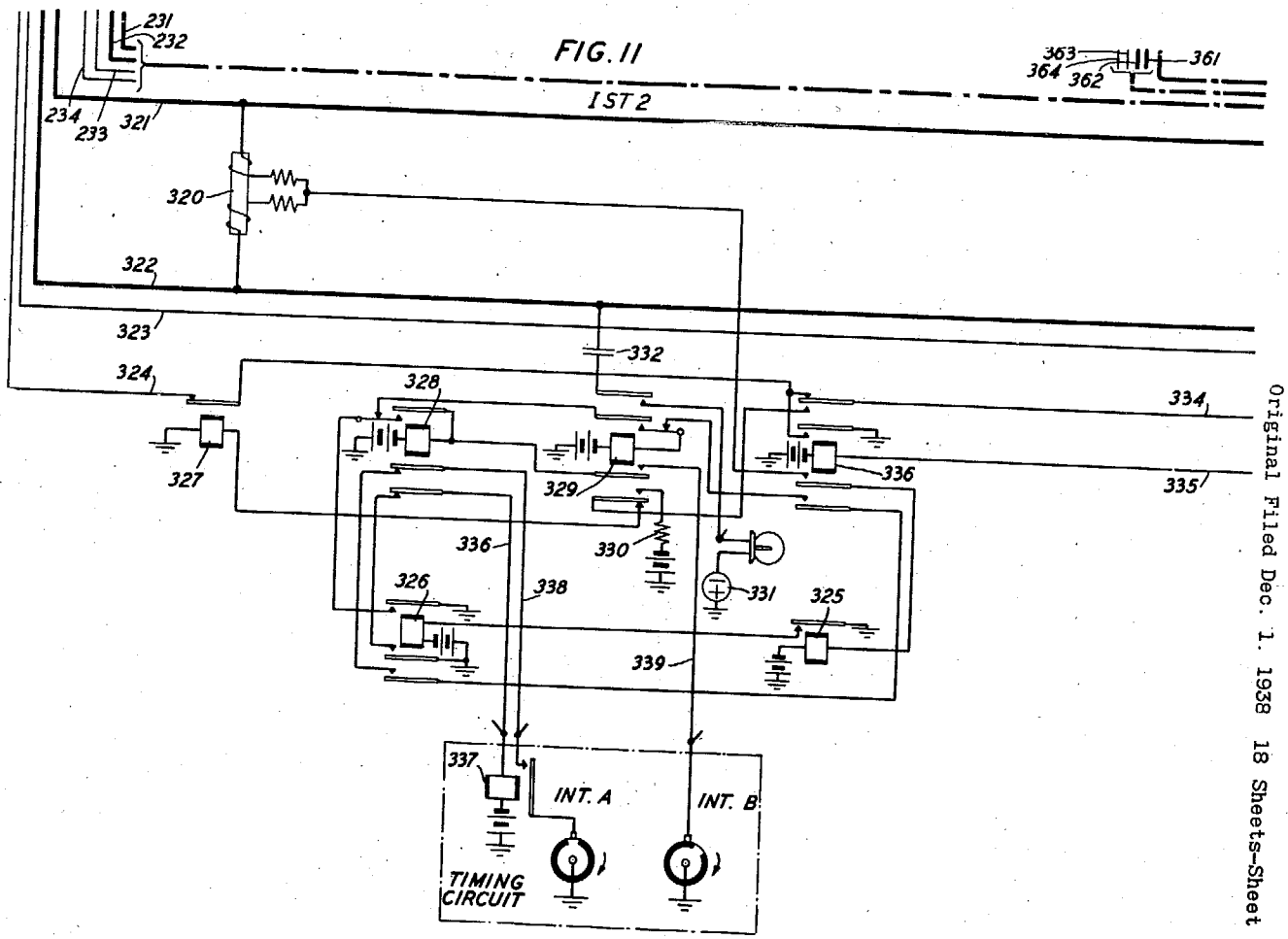
Fig. 11 shows an interswitch trunk circuit IST2 connected to sets of terminals in the banks of selectors TS2 and TS4 of Fig. 8.
Figure 12:
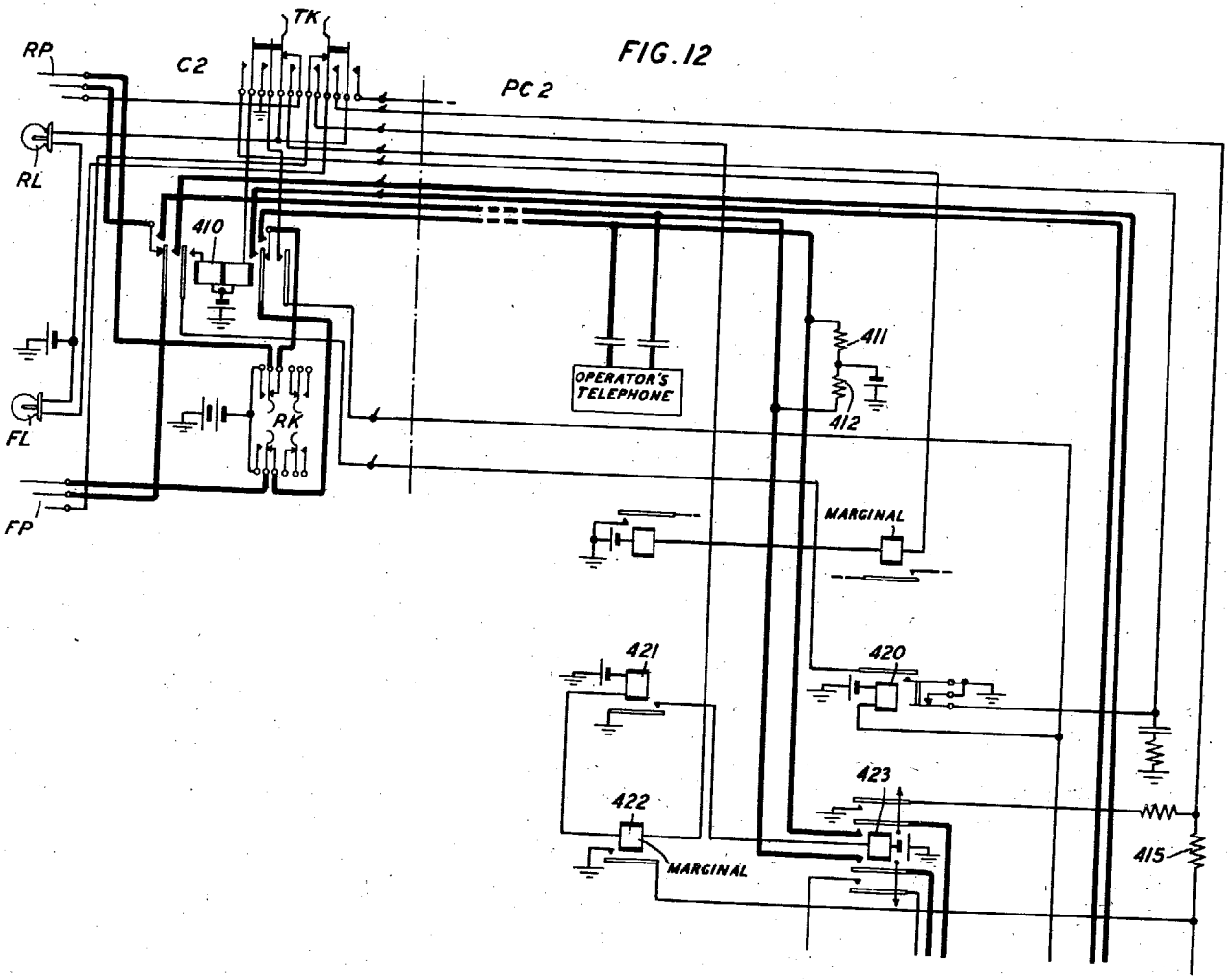
Fig. 12 shows an operator's position circuit PC2 and a cord circuit C2 for connection with jacks J5, J6, J7, J8, J9, J10, J11 and J12 of Figs. 9, 10, 15 and 16.
Figure 13:
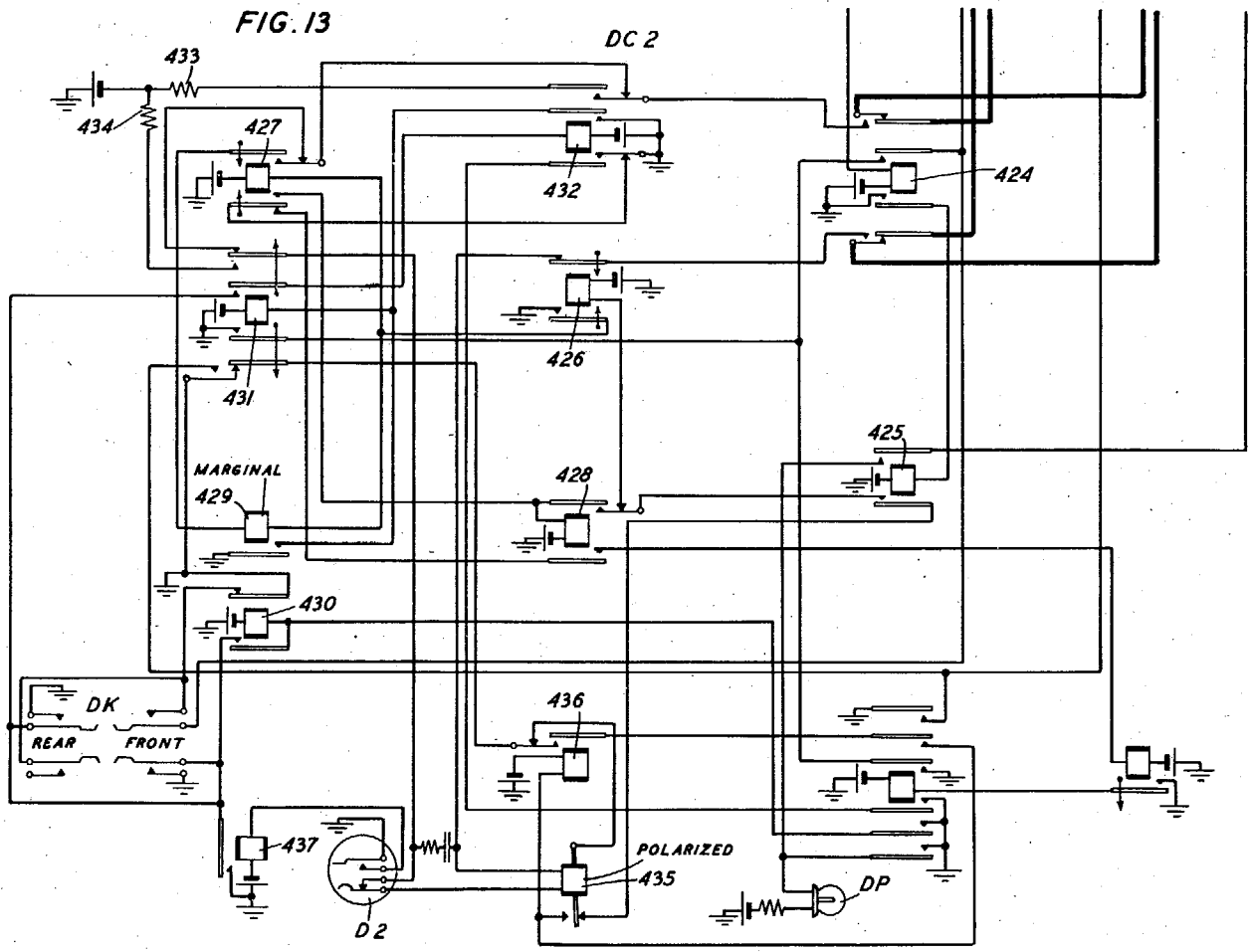
Fig. 13 shows a dial circuit DC2 associated with the position circuit PC2 of Fig. 12.

The system represented in the drawings includes a plurality of toll offices, each of which comprises a toll board with operators' positions and cords for answering calls incoming from local manual or dial offices, from toll subscribers' lines, from community dial offices, or from other toll offices and for extending an incoming call to a switching trunk leading to a called manual or dial local office, to a called toll subscriber's line, to a community dial office, or to an intertoll trunk. Outgoing jacks connect to switching trunks, toll lines, trunks to community dial offices, and intertoll trunks. Answering jacks are directly connected to recording trunks, toll subscribers' lines, trunks from community dial offices, and intertoll trunks. Toll route selectors and auxiliary toll route selectors are provided for use on calls incoming over intertoll trunks to establish connections with called toll, local, or community dial offices. The operators' positions are provided with dials for use in controlling the operation of incoming and auxiliary toll route selectors in other toll offices and for controlling the operation of selector and connector switches in local or community dial offices. While not shown in the drawings, the operator's positions may be provided with key-sets in place of dials, in which case senders are associated with the outgoing trunks to register the key-set impulses and control the selectors.

The toll board in one toll office is represented by an operator's cord C1 and position dial circuit PD1, the outgoing jacks J1 and J2 and the answering jacks J3 and J4. The jack J1, outgoing trunk OT1, two-way trunk circuit TWT1, incoming toll route selector TS1, and the composite signaling circuit CS1 are all associated with a two-way intertoll trunk T1, the distant end of which terminates in a second toll office. The jack J2, outgoing trunk circuit OT3, two-way trunk circuit TWT3, incoming toll route selector TS3 and composite signaling circuit CS3 are all associated with a two-way intertoll trunk T3, the distant end of which terminates in a third toll office. The incoming toll route selectors, such as TS1 and TS3, have access to auxiliary toll route selectors. The auxiliary route selectors, such as AS1, have access to toll lines, intertoll trunk, switching trunks leading to the local offices, trunks leading to community dial offices, and to incoming trunk circuits terminating at a toll operator's positions, such for instance, as the trunk circuit IT1 connecting to answering jack J3. Interswitch trunk circuits such as IST1 are associated with auxiliary route selectors having access to ring-down toll lines or to community dial offices of the link type, that is, offices in which impulse responsive apparatus is connected to a trunk in response to its seizure at the toll office.

The toll board in the second toll office is represented by the operator's cord C2, position circuit PC2, dial circuit DC2, and jacks J5 to J12, inclusive. The jack J5, outgoing trunk circuit OT2, two-way trunk circuit TWT2, incoming toll route selector TS2, and composite signaling circuit CS2 are all associated with the intertoll trunk T1 connecting with the first toll office. The jack J6, outgoing trunk circuit OT4, two-way trunk circuit TWT4, incoming toll route selector TS4 and composite signaling circuit CS4 are all associated with an intertoll trunk T4 leading to a fourth toll office. The incoming toll route selectors TS2 and TS4 have access to auxiliary toll route selectors. The auxiliary selectors, such as AS2, have access to toll lines, intertoll trunks, switching trunks leading to local offices, trunks to community dial offices and to incoming trunk circuits such as IT2 connecting to answering jack J7. Interswitch trunk circuit IST2 is individual to the auxiliary selector AS2 which has access to both ring-down lines such as RDL and trunks, such as CDT, to community dial offices of the link type.

The outgoing trunk circuits OT1 and OT2, incoming two-way trunk circuits TWT1 and TWT2, toll route selector circuit TS2, interswitch trunk circuit IST2, auxiliary toll route selector AS2, incoming trunk circuit IT2, ring-down toll line circuit RD1, and community dial office trunk circuits CDT1 and CDT2 are all shown in detail.

The other trunk and selector circuits are not shown in detail but are similar to those which are shown in detail.

The incoming and auxiliary toll route selectors TS1, TS2, TS3, TS4, AS1 and AS2 are all of the two-motion step-by-step type, the structure and operation of which is described in "Automatic Telephony" by Smith and Campbell, second edition, pages 53 to 65, inclusive. The selector AS2 includes normal-post springs 358, the right and left-hand sets of contacts of which are independently actuated upon selection of particular levels in the manner shown in the patent to H. Sengebusch, No. 1,888,700, granted November 22, 1932.

To further explain the system represented in the drawings, assume that a call, incoming to the toll board in the first office is answered by connecting the plug RP to an answering jack, the talking key TK being operated to connect the operator's telephone set to the cord. The sleeve relay 15 operates closing a circuit for operating busy test relay 16. Relay 16 opens the busy test circuit and bridges relay 18 across the tip and ring conductors of plug RP. Relay 15 also closes a circuit for operating relay 7 and relay 7 prevents the lighting of supervisory lamp RL. If the connected line or trunk has a high resistance sleeve, as is the case with recording trunks and tributary toll lines, the marginal sleeve relay 14 does not operate. But, if the connected line is a toll line, the sleeve resistance is low enough to cause the operation of relay 14. Assume further that the call is one which is routed through the second toll office, and that the answering operator connects the plug FP to jack J1 of outgoing trunk circuit OT1. The position dial key DK is operated to the position. Front closing a circuit for operating relay 32. Relay 32 connects battery to the front plugs of the cords at the position, thereby closing a circuit through conductor 34, upper winding of relay 29, back contact of relay 26, ring conductors of plug FP and jack J1, back contact of relay 50 and the winding of relay 94. Relay 94 of trunk circuit OT1 and relay 29 of cord circuit C1 are operated by the current in this circuit. Relay 94 closes a circuit for operating relay 93. Relay 93 closes a circuit for operating relay 89, and closes a circuit including ballast lamp 74 for operatively energizing the upper windings of relay 70. Relay 89 closes a circuit for operating relay 86 and opens the short circuit around resistor 87. Relay 86 disconnects the winding of relay 59 from conductors 123 and 133, connects ground to conductors 123 and 133 to operate relay 129 and to guard trunk T1 from seizure by an auxiliary toll route selector such as AS1, closes a circuit for lighting the busy lamp BL1 associated with jacks J1, closes a circuit through the lower winding of relay 70, resistor 92, and the back contact of relay 90 for holding relay 70 operated, and connects the lower winding of relay 70 and winding of relay 91, in series, through the tip conductors of jack J1 and plug FP, and through a front contact of relay 29 to conductor 36 of the dial circuit. The operation of relay 70 disconnects ground from, and connects signaling battery through resistor 73, to and through retard coil 109 to operate the signaling relay 210 at the other end of trunk T1 as a seizure signal as hereinafter more particularly explained. With relays 29 and 86 operated, a circuit is closed for locking relay 29 and operating relay 58. This circuit is traced from battery through back contacts of relays 41 and 43, upper winding of relay 42, conductor 35, lower winding and front contact of relay 29, sleeve conductor of plug FP and jack J1, winding of relay 57, back contact of relay 80, winding of relay 58, to ground at a front contact of relay 86. The operation of relay 58 closes a circuit for operating relay 64. Relay 64 locks under control of relay 86 and closes circuits for operating relays 75 and 81. Relay 75 disconnects the talking conductors 101 and 102 from conductors 121 and 122 of the two-way trunk circuit TWT1, closes a holding circuit including back contacts of relays 83 and 90 for holding relay 70, and closes a connection between ballast lamp 74 and the upper windings of relay 70 which is independent of relay 93. Relay 81 closes a circuit for operating relay 65 and connects ground to sleeve conductor 133 independent of relay 86. Relay 65 holds the busy lamps BL1 lighted independent of relay 86, and provides an impulse bias for relay 70 by short-circuiting resistor 67, any variation in the signaling battery being compensated by variation in the energization of the upper windings of relay 70 due to variation in the resistance of ballast lamp 74. This feature is more completely described and is claimed in the patent to O. R. Miller No. 2,174,006, granted Sept. 26, 1939.

Returning now to the cord and dial circuits, relay 42 is operated by the energization of its upper winding in series with the locking winding of relay 29 and the winding of relay 58 as hereinbefore traced. Relay 42 closes a circuit for operating relay 43. Relay 43 closes a circuit for operating relay 44 and opens the normally closed short circuit around the winding of marginal relay 46. The resistance of the sleeve circuits of the outgoing trunk circuits associated with intertoll selectors and trunks to community dial offices is low enough to cause the operation of relay 46, but the sleeve resistance of switching trunks to local dial offices is high enough to prevent the operation of relay 46. Since the sleeve resistance of outgoing trunk circuit OT1 is low, relay 46 operates. Relay 44 closes a circuit for operating relay 45. Relay 46 closes a circuit for operating relay 47. Relay 45 locks under control of the dial key, releases relay 32, and closes the dialing loop which is traced from battery through the lower winding of relay 70, winding of marginal relay 91, a front contact of relay 86, back contact of relay 50, tip conductors of jack J1 and plug FP, a front contact of relay 29, conductor 36, front contact of relay 45, impulse contacts of dial D1, back contact of relay 48, winding of polarized relay 41, conductor 37, front contact of relay 29, thence to ground through the winding of relay 94 as hereinbefore traced for operating relays 29 and 94. When relay 32 releases, the dial pilot lamp DP is lighted in a circuit from battery through back contacts of relays 32 and 31, a front contact of relay 44, and a back contact of relay 47; and when relay 47 operates, the lamp DP remains lighted under control of relay 46. The operation of relay 47 also closes a circuit through the lower winding of relay 42 in parallel with the lower winding of relay 47. The energization of the lower winding of relay 42 opposes the energization of the upper winding; but as long as the sleeve resistance of the connected trunk circuit is low, the energization of the upper winding is sufficient to hold relay 42 operated. Relay 47 locks under control of the dial key and closes a circuit for operating relay 48. Relay 48 opens the short circuit around resistor 49 thereby increasing the resistance of the dialing loop sufficiently to prevent the operation of marginal relay 91 in the outgoing trunk circuit.

When the dial pilot lamp lights, the operator dials the number of the called toll route and the number of the called local office and subscriber's number if the call terminates in a dial office. When the dial is moved off normal, relay 48 releases, thereby short-circuiting resistor 49 to cause the operation of relay 91. Relay 91 closes a circuit for operating relay 90. Relay 90 locks under control of relay 93 and opens the circuit through resistor 92 so that the operation of relay 70 is now under the sole control of the impulse contacts of the dial D1. Relay 70 releases and reoperates each time the impulse contacts open and close, thereby repeating the dial impulses over trunk T1 to the signaling relay 210 of composite signaling circuit CS2.

When relay 210 of composite signaling circuit CS2 operates, due to the seizure of trunk circuit OT1 and operation of relay 70 as hereinbefore described, it closes a circuit from ground through its front contact, back contacts of relays 257 and 259 of the outgoing trunk circuit OT2, conductor 224, back contacts of relays 229 and 226 of the two-way trunk circuit TWT2, and through the winding of relay 228 to battery. Relay 228 operates, disconnecting the winding of relay 229 from conductor 223, and connecting ground to conductor 223 to operate relay 256 of the outgoing trunk circuit OT2 and to conductor 233 to guard against seizure of this trunk by an auxiliary toll route selector such as AS2. Relay 256 disconnects relay 254 from the sleeve of jack J5 and connects battery to the sleeve of jack J5 to guard against connection of a cord thereto. Relay 256 also opens the repeater termination comprising condenser 283 and resistor 284 from the tip and ring conductors of signaling circuit CS2, and closes a circuit for operating relay 259. Relay 259 closes a circuit for lighting the busy lamp BL5, and opens the normally closed circuit from battery through resistor 285 and the winding of relay 203 so as to place the pad control relay 203 under control of relay 268. Relay 256 maintains connection between the ground at the front contact of relay 210 and conductor 224 after relay 259 operates. With relay 228 operated, the ground at the front contact of relay 210 is connected through a back contact of relay 257, front contact of relay 256, conductor 224, back contact of relay 229, thence through the winding of relay 225, a front contact of relay 228, conductor 290, thence in a simplex path through resistors 261 and 262, back contacts of relay 260, windings of retard coil 280, back contacts of relay 266, conductors 221 and 222, outer front contacts of relay 228, conductors 241 and 242, back contacts of relay 310 of incoming toll route selector TS2, and through resistors 307 and 308 to resistor 309, thence through a back contact of relay 310 and the winding of line relay 301 of selector TS2 to battery. Relays 225 and 301 are operated by the current in this circuit. Relay 225 closes a circuit for operating the slow-to-release relay 226. Although relay 226 disconnects the winding of relay 228 from conductor 224, relay 228 is held operated through resistor 227 to ground at a front contact of each of relays 225 and 226. Relay 226 connects ground through conductor 243 to conductor 318 to hold selector TS2 and succeeding selectors as hereinafter described. Relay 301 closes a circuit for operating the slow-to-release relay 302. Relay 302 also connects ground to conductor 318.

The winding of pad control relay 268 is bridged across the ends of resistors 261 and 262 for operation when the above traced simplex circuit is unbalanced. Since the intertoll trunk T1 is provided with transmission pads, the resistors 261 and 262 of outgoing trunk circuit OT2 are of equal resistance; and since resistors 307 and 308 of toll route selector TS2 are also equal in resistance, the simplex circuit through conductors 221 and 222 is balanced and relay 268 of the outgoing trunk circuit does not operate. Pad control relays 203 and 204 release and the pads P3 and P4 are short-circuited.

When the calling toll operator dials the first digit of the toll route number, the impulses created by the dial D1 are repeated by relay 70 to relay 210. The release and reoperation of relay 210 in response to each impulse of the train causes the release and reoperation of each of relays 225 and 301. Being slow in releasing, relays 226 and 302 remain operated during the response of relays 225 and 301 to the dial impulses. The first release of relay 301 closes a circuit for operating the vertical-stepping magnet 305 and the slow-to-release relay 303 in series. The operation of magnet 305 steps the brushes 311, 312, 313 and 314 up to the first level of the terminal bank. The vertical-off-normal springs 316 are actuated as soon as the shaft is moved out of normal position, closing a circuit including the front contact of relay 303 and conductor 318 for operating relay 304. Relay 304 locks through the back contact of the rotary-stepping magnet 306 and a front contact of relay 304 to ground at a back contact of relay 310. When relay 301 reoperates at the end of the first impulse, magnet 305 releases but relay 303 remains operated until all of the impulses in the train have been received by relay 301. Each succeeding release and reoperation of relay 301 causes the operation and release of magnet 305, stepping the brushes of the selector up to the level corresponding to the digit dialed. When relay 303 releases after all of the impulses in the train have been received, it closes the circuit for operating the rotary-stepping magnet 306. The operation of magnet 306 rotates the brushes one step into engagement with the first set of terminals in the selected level. When magnet 306 opens its back contact, relay 304 releases. The release of relay 304 causes the release of magnet 306. If the terminal with which test brush 313 is in engagement is guarded by a ground potential, relay 304 reoperates when magnet 306 releases, the operating circuit being traced through the lower front contact of springs 316, back contact of magnet 306, lowermost back contact of relay 310, and test brush 313. The reoperation of relay 304 causes the reoperation of magnet 306, advancing the brushes to the next set of terminals. The operation of magnet 306 releases relay 304 and the release of relay 304 releases magnet 306. Relay 304 and magnet 306 repeat this cycle of operations to advance the brushes step by step until brush 313 encounters a terminal not marked by ground potential. Whereupon relay 310 is operated to seize the idle set of terminals, the operating circuit being traced from battery through the winding of relay 304, front contact of the vertical-off-normal springs 316, back contact of magnet 306, winding of relay 310, lower back contact of the "11th rotary step" springs 317 to ground on conductor 318. Relay 304 is marginal and does not reoperate in series with the winding of relay 310. Relay 310 disconnects the winding of relay 301 from conductors 241 and 242 and connects these conductors through brushes 311 and 312 to and through conductors 321 and 322 of an interswitch trunk circuit IST2, to and through back contacts of relay 357 of an auxiliary toll route selector AS2, and through resistors 341 and 342, then together through resistor 343 and a back contact of relay 357 to the winding of relay 351. Relay 310 also extends the connection from holding ground potential at the front contact of relay 226, through conductors 243 and 318, lowermost front contact of relay 310, and through brush 313 to the sleeve conductor 323 of trunk circuit IST2 and to conductor 340 of selector AS2 to guard against seizure of this trunk and selector by another toll route selector having access thereto. The release of relay 301, when relay 310 operates, causes the release of relay 302; but relay 310 is held over conductor 243 to ground at the contact of relay 226.

When conductors 241 and 242 are connected by the operation of relay 310 through brushes 311 and 312 to the winding of relay 351 of the auxiliary toll route selector AS2 as above traced, relay 351 is operated and relay 225 is held operated under the control of signaling relay 210. Pad control relay 268 is also held operated since resistors 341 and 342 are equal in resistance and the simplex circuit is balanced. Relay 351 closes a circuit for operating slow-to-release relay 352, and relay 352 connects ground to sleeve conductor 340. When the calling operator dials the second digit of the toll route number, relay 70 again repeats the impulses to relay 210. Each release and reoperation of relay 210 causes the release and reoperation of each of relays 225 and 351. Relays 226 and 352 remain operated during the response of relays 225 and 351 to dial impulses. The release of relay 351 closes a circuit for operating the vertical-stepping magnet 355 and relay 353 in series. The operation of magnet 355 steps the brushes 345, 346, 347 and 348 up to the first level of the bank. The vertical-off-normal springs 344 are actuated when the shaft moves out of normal position, closing a circuit for operating relay 354, this circuit includes the front contact of relay 353, and the ground connected to conductor 340 from the front contacts of relays 226 and 352. Relay 354 locks through the back contact of rotary-stepping magnet 356 to ground at a back contact of relay 357. The release of relay 351 at the end of the first impulse causes the release of magnet 355. Being slow in releasing, relay 352 remains operated while relay 351 is responding to dial impulses and relay 353 remains operated until all of the impulses in the train have been received. Each succeeding impulse of the train causes the release and reoperation of relay 351 and magnet 355, advancing the brushes step by step up to the level corresponding to the digit dialed. When relay 353 releases, after relay 351 has received all of the impulses, it closes a circuit including a front contact of relay 354 for operating the rotary-stepping magnet 356. The operation of magnet 356 advances the brushes into engagement with the first set of terminals in the selected level and causes the release of relay 354. If the trunk connected to the first set of terminals is busy, the terminal engaged by test brush 347 is connected to ground potential; and when magnet 356 releases, due to the release of relay 354, it closes a circuit including brush 347 and a back contact of relay 357 for reoperating relay 354. The reoperation of relay 354 again closes the circuit for operating magnet 356 and the operation of magnet 356 steps the brushes into engagement with the next set of terminals. Relay 354 and magnet 358 are effective in this manner to continue the advance of the brushes from one set of terminals to the next until test brush 347 encounters a terminal which is not guarded by ground potential. Whereupon relay 357 is operated by the current in a circuit from battery through the winding of relay 354, lower contact of springs 344, back contact of magnet 356, winding of relay 357, back contact of the "11th rotary step" springs 349, to ground at a front contact of relay 352. Relay 354 is marginal and does not reoperate in series with relay 357. Relay 357 extends the holding ground, connected to conductor 340 as hereinbefore described, through brush 347 to the test terminal of the seized trunk to guard this trunk against seizure by another selector. Relay 357 also disconnects the winding of relay 351 from conductors 321 and 322 causing the release of relays 351 and 352. Relay 357 is now held operated through conductors 340, 323, 318 and 243 to ground at the front contact of relay 226.

Figure 14:
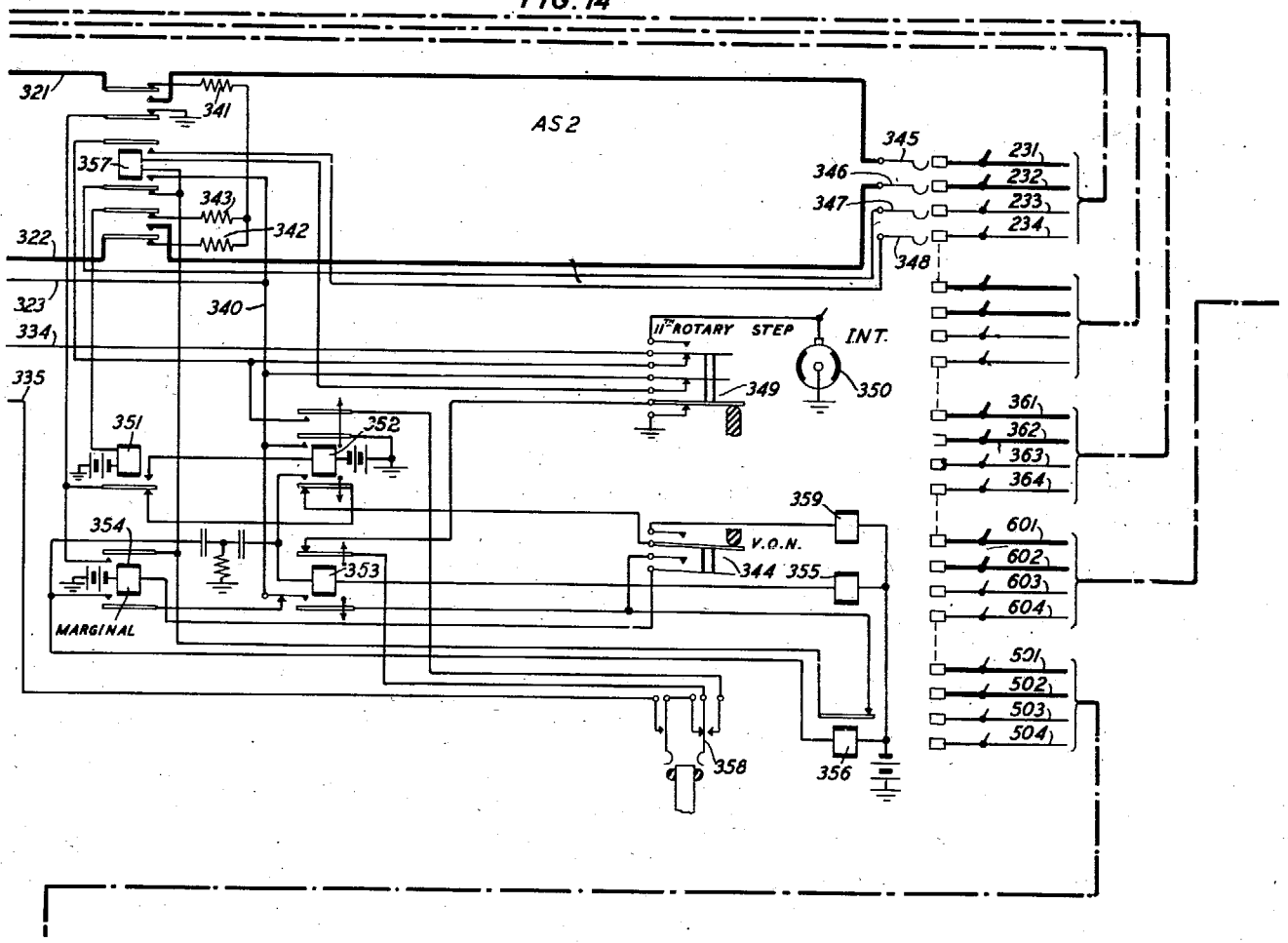
Fig. 14 shows an auxiliary toll route selector AS2 connected to the trunk circuit IST2 of Fig. 11.
Figure 15:
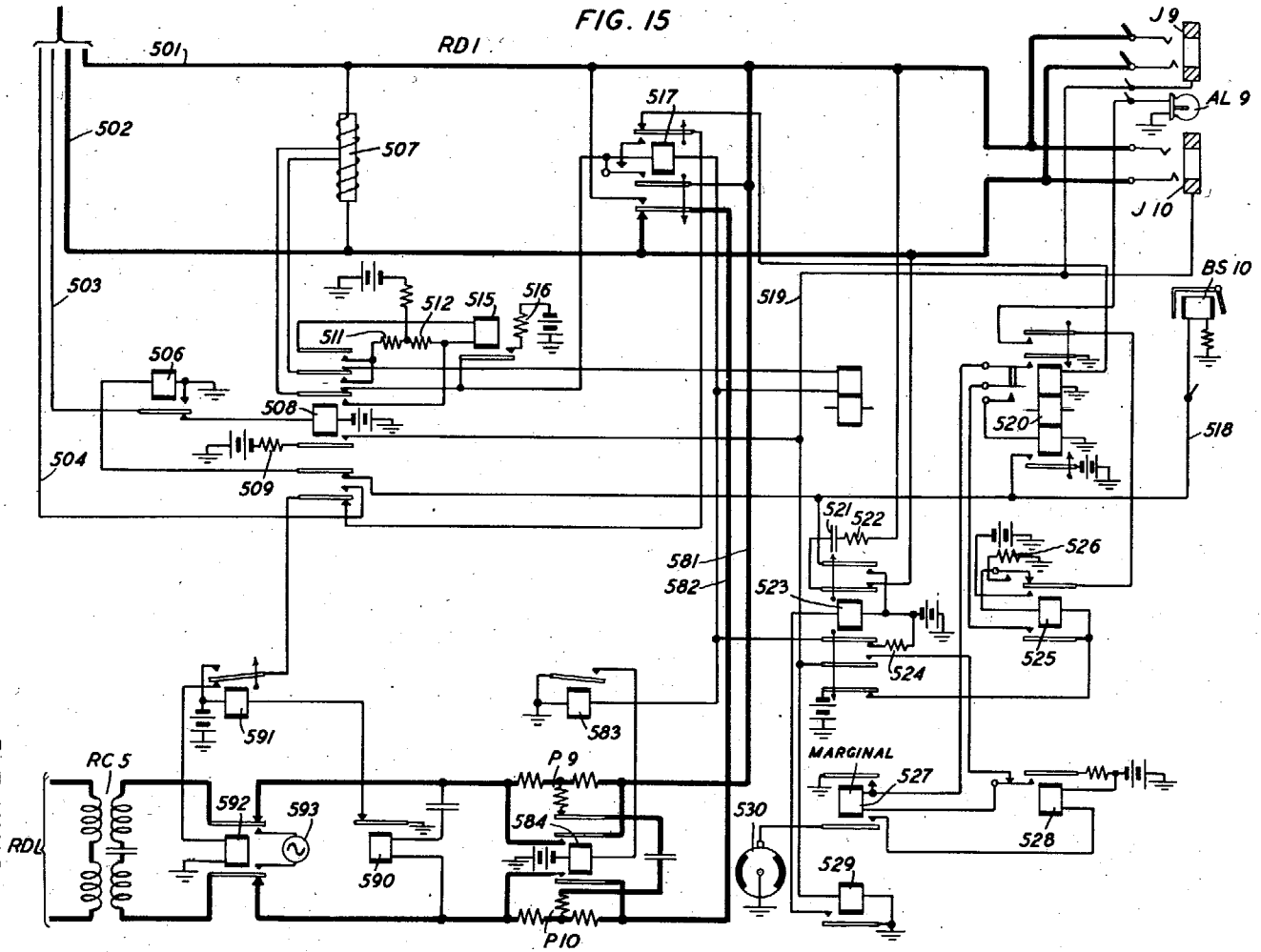
Fig. 15 shows a ring-down toll line circuit RD1 and jacks J9 and J10 associated with a ring-down toll line RDL.
Figure 16:
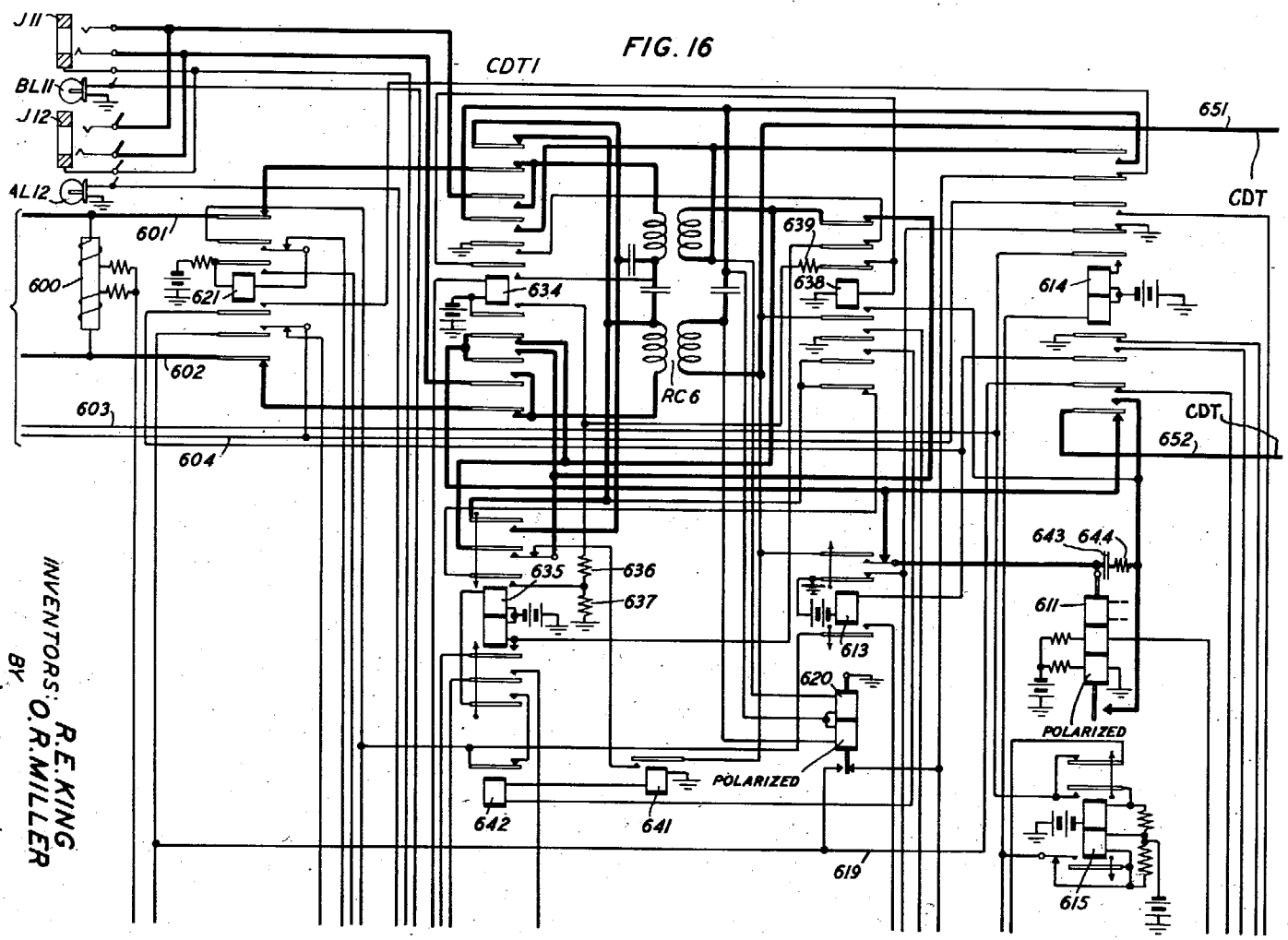
Figs. 16 and 17 show a two-way trunk circuit CDT1 connecting one end of a trunk CDT to terminals in the bank of selector AS2 of Fig. 14.
Figure 17:
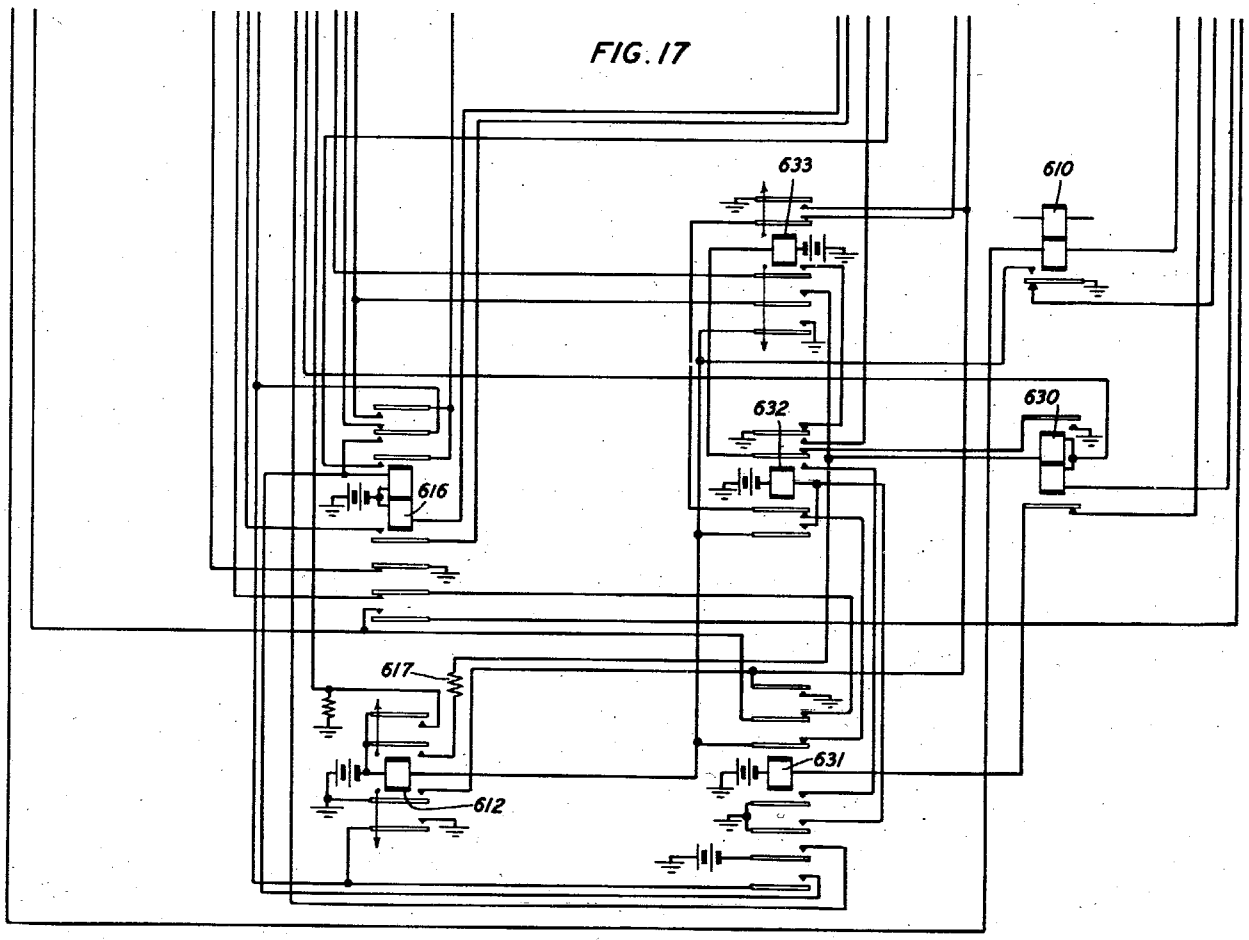
Figure 18:
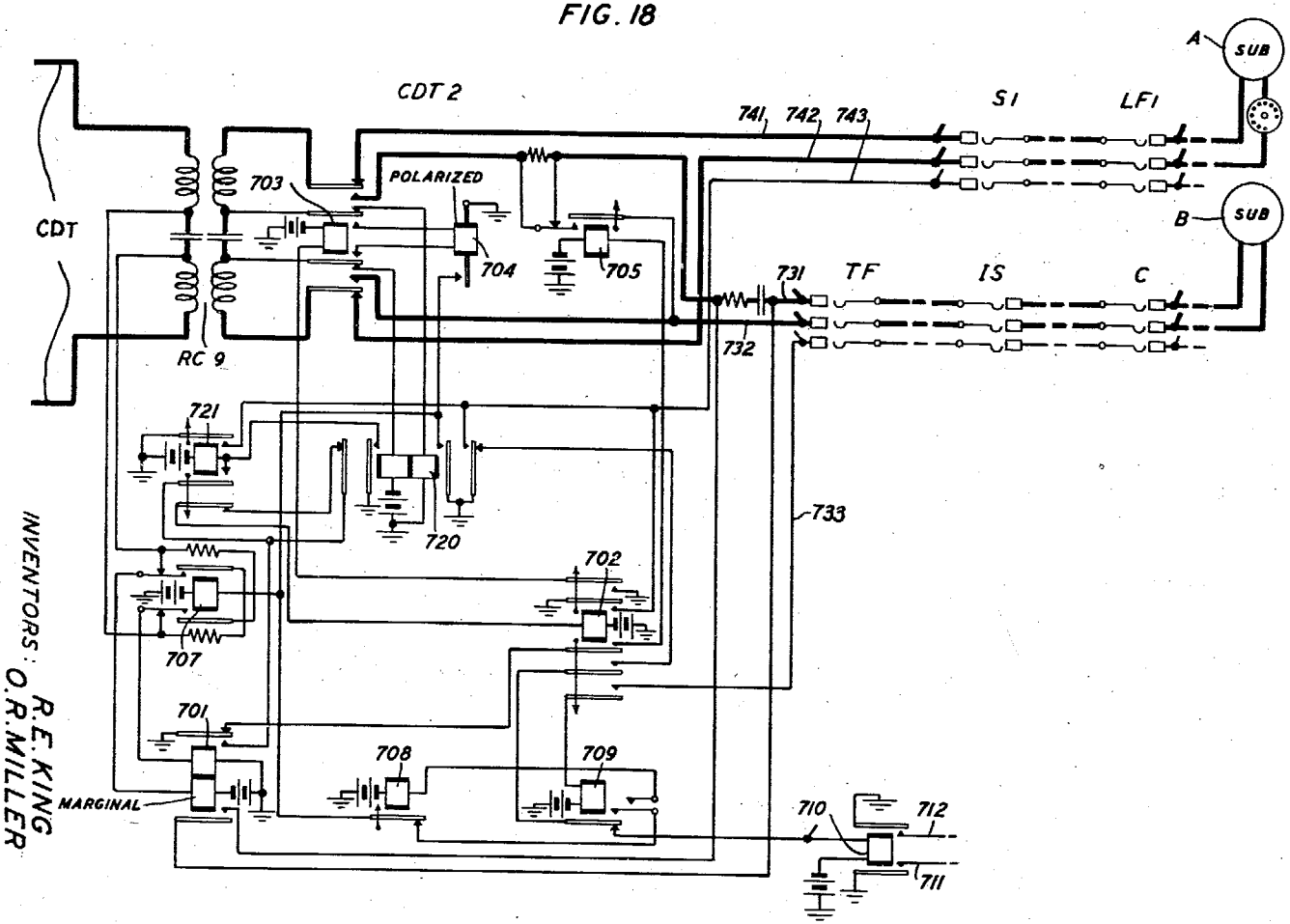
Fig. 18 shows a two-way trunk circuit CDT2 in a community dial office at the other end of trunk CDT, a trunk finder TF and incoming selector IS, a connector C, a line finder LF1 and first selector S1, and two subscribers' stations A and B.

Assume first that the call in question is one which is routed to a toll operator in the second office, in which case selector AS2 seizes a trunk IT2 terminating at an answering jack J7, which trunk is connected to the middle set of terminals shown in Fig. 14. In this case the operation of relay 357 connects the talking conductors 321 and 322 through brushes 345 and 346 to the tip and ring conductors 361 and 362 of trunk IT2, thence through the windings of retard coil 365, and through resistors 366, 367, and 368 to the winding of relay 371. Relay 371 is operated and relay 225 is held operated under the control of the ground at the front contact of signaling relay 210. With relay 381 non-operated, resistor 369 is short-circuited and, since the resistance of resistors 366 and 367 is equal to that of resistor 368, the simplex is balanced so that pad control relay 268 in trunk circuit OT2 remains non-operated. In the incoming trunk circuit IT2, the winding of pad control relay 375 is bridged across the end of the simplex path but does not operate since the simplex circuit is balanced when an intertoll trunk such as trunk T1 is connected to the incoming trunk circuit IT2. The aforementioned operation of relay 371 closes a circuit for lighting answering lamp AL7 and connects the source of ringing current 372 through condenser 399, talking conductor 392, and a talking condenser 370 to talking conductor 362 to transmit a ringing tone to the calling operator to indicate that the toll operator in the second office is being signaled.

The calling operator having completed dialing, restores the dial key DK to normal. Relays 45 and 47 now hold under control of relay 44. When the last dial impulse has been transmitted and the dial reaches normal, relay 43 reoperates thereby closing a circuit from ground at its front contact, through the normally closed contacts of the dial key to the impulse contacts of the dial thereby short-circuiting the winding of relay 94 but holding relays 91 and 70 operated. The release of relay 94 causes the release of relay 93; and the release of relay 93 causes the release of relays 89 and 90. The release of relay 89 causes the release of relay 86. After relay 93 releases and before the slow-to-release relay 89 releases, relay 50 operates and relay 70 is held operated through resistor 92, the upper front contact of relay 89 and back contact of relay 93.

When relay 90 releases, relay 70 is held operated through resistor 92, back contact of relay 90, back contact of relay 83, to ground at a front contact of relay 75. Relay 50 locks under control of relay 75; connects ground to the winding of relay 58 to hold relay 58 independent of relay 86; connects the winding of pad control relay 103 to the contact of control relay 57; disconnects the tip and ring conductors of jack J1 from the windings of relays 91 and 94; and closes a circuit for operating polarized relay 41 of the dial circuit from 24-volt battery through resistor 84, back contact of relay 80, front contacts of relays 75 and 50, lower winding of retard coil 53, lowermost front contact of relay 50, ring conductor of jack J1, back contact of relay 26, front contact of relay 29, conductor 37, winding of relay 41, resistor 49, back contacts of key DK to ground at the front contact of relay 48. Relay 50 also releases relay 91; connects ground through resistor 85, back contact of relay 80, front contact of relay 50, upper winding of retard coil 53, and another front contact of relay 50, to the tip conductors of jack J1 and plug FP; opens the repeater termination comprising condenser 54 and resistor 55 normally bridged across the talking conductors 101 and 102; closes the talking circuit from the cord through repeating coil RC1 and condensers 105 to the conductors of trunk T1; and bridges the winding of ring-up relay 61, condenser 63 and the windings of retard coil 53 across the talking conductors. The aforementioned operation of relay 41 causes the release of relays 42, 46 and 29. The release of relay 42 causes the successive release of relays 43 and 44. The release of relay 44 causes the release of relays 45 and 47. The release of relay 29 closes a circuit for operating sleeve relays 24 and 25 in series with the windings of relays 57 and 58 of the outgoing trunk circuit. The marginal sleeve relay 24 operates because the connected outgoing trunk is an intertoll trunk and the sleeve resistance of the outgoing trunk circuit OT1 is low. Relay 25 closes a circuit for holding relay 7 operated and closes a circuit for operating relay 26. With relay 29 released and relay 26 operated, the talking circuit is closed between plug RP and plug FP and the winding of supervisory relay 28 is connected across the tip and ring conductors of plug FP. Relay 28 operates in series with resistors 84 and 85 of the outgoing trunk circuit, lighting supervisory lamp FL until the call is answered. After the talking key is released and if the marginal sleeve relay 14 is operated, the operation of marginal sleeve relay 24 closes a circuit for operating relay 9. Relay 9 locks under control of relays 15 and 25 and closes a circuit for operaitng relay 10. Relay 10 opens the short circuit around each of resistors 11 and 12 thereby increasing the resistance of the circuit through the sleeve conductor of plug FP sufficiently to cause the release of relay 24 and to cause the release of relay 57 of the outgoing trunk circuit OT1. With relay 57 non-operated and relay 50 operated, relay 103 operates thereby short-circuiting the transmission pads P1 and P2. If the calling line or trunk with which plug RP is connected were a recording trunk or tributary line, the sleeve resistance would be high enough to prevent the operation of relay 14 in which case relays 9 and 10 would not be operated; relay 57 would operate in the sleeve circuit; and relay 103 would remain non-operated and the pads P1 and P2 would not be short-circuited.

When an operator answers the call by connecting plug RP of a cord C2 to answering jack J7, battery is connected to sleeve conductor 393 to operate relay 394. Relay 394 closes a circuit for operating relay 395. Relay 395 opens the repeater termination comprising resistor 397 and condenser 398 normally bridged across talking conductors 391 and 392 and closes a circuit for operating relay 396. This circuit is traced through the lower front contact of relay 395, front contact of relay 371 to sleeve conductor 363, thence to ground at the front contact of relay 226 of two-way trunk circuit TWT2. Relay 396 locks through the back contact of relay 374 to sleeve conductor 363 independent of relay 395, extinguishes lamp AL7, opens the connection through ringing-tone condenser 399 and closes a circuit for operating relay 240 of the two-way trunk circuit TWT2. This circuit is traced from ground through a front contact of relay 395, a back contact of relay 387, a front contact of relay 396, conductor 364, brush 348 of selector AS2, front contact of relay 357, a back contact of the "11th rotary step" springs 349, conductor 334, back contact of relays 336 and 327 of trunk circuit IST2, conductor 324, brush 314 of selector TS2, inner upper front contact of relay 310, upper back contact of the "11th rotary step" springs 317, conductor 244 and the winding of relay 240. Relay 240 connects battery through resistor 275, through back contacts of relays 230 and 270 and retard coil 209 to the windings of relay 210. Relay 210 is not operatively affected but relay 110 of the composite signaling circuit CS1 in the first toll office operates, closing a circuit for operating the answering supervisory relay 80. Relay 80 disconnects ground and battery through resistors 84 and 85 from the tip and ring conductors of jack J1 thereby causing the release of relay 28 to extinguish the cord supervisory lamp FL, as an indication that the call has been answered.

If the call is answered before the calling operator restores the dial key DK, the resistance in the sleeve circuit is increased when relay 80 operates and opens the short circuit around resistor 87 to cause the release of differential relay 42. Relay 42 releases relay 43, relay 43 causes the release of relays 46 and 44; and relay 44 extinguishes lamp DP as an indication that the call is answered. Relay 47 is held operated through a front contact of the dial key. The release of relay 46 opens the circuit through the lower winding of relay 42 thereby causing the reoperation of relay 42. Relay 42 reoperates relay 43 and relay 43 reoperates relay 44. Relay 46 does not reoperate due to the inclusion of resistor 87 in the sleeve circuit. With relay 47 operated and relay 46 non-operated, the lamp DP is not lighted by the reoperation of relay 44. To disconnect the dial circuit, the key DK is restored; whereupon relays 94, 93, 89 and 86 and relays 91 and 90 of the outgoing trunk circuit are released and relay 50 of the outgoing trunk circuit is operated as hereinbefore described. The restoration of the dial key also causes the release of the relays in the dial circuit, the release of relay 29 of the cord circuit, and the operation of relays 25 and 26 of the cord circuit. With relay 29 released, relay 26 operated, and with relays 50 and 80 of the outgoing trunk circuit operated, relay 28 does not operate and lamp FL does not light.

The answering operator extends the connection to a desired trunk or line through plug FP. While the talking key TK of cord C2 is operated, a circuit is closed for operating relay 380. This circuit includes the upper back contact of relay 376, thence in a simplex circuit path through resistor 385 and resistor 386 in series with the winding of relay 387, the windings of retard coil 388, conductors 391 and 392, tip and ring conductors of jack J7 and plug RP, front contacts of relay 410, and through resistors 411 and 412 to battery. Relay 380 closes a circuit for operating relay 381. Relay 381 opens the circuit path through the winding of relay 375 to prevent the operation of relay 375, opens the short circuit around resistor 369 and short-circuits resistor 367 thereby unbalancing the simplex circuit path between trunk circuits IT2 and OT2 to operate relay 268 of the outgoing trunk circuit OT2. Relay 268 closes a circuit for operating relay 203. Relay 203 opens the circuit for operating relay 204; and with relay 204 released the pads P3 and P4 are included in the talking circuit. After the talking key of cord C2 is restored to normal, relay 380 is held operated if the trunk or line connected to plug FP is a switching trunk or tributary line but is released if plug FP is connected to a toll line or intertoll trunk. The release of relay 380 causes the successive release of relays 381, 268 and 203 and the operation of relay 204 so as to short-circuit the pads P3 and P4.

If the intertoll trunk associated with outgoing trunk circuit OT2 is one which is not provided with transmission pads, relay 268 is not provided. If the intertoll trunk associated with outgoing trunk circuit OT2 is one which does not require the short-circuiting of the pads of a line or trunk to which the incoming trunk circuit IT2 is connected by cord C2, resistors 261 and 262 of the outgoing trunk circuit OT2 would be of such a value as to unbalance the simplex circuit and thereby cause the operation of relay 375 of the incoming trunk circuit IT2. The operation of relay 375 closes a circuit for operating relay 376. Relay 376 disconnects relay 380 from conductors 391 and 392 and connects batter through resistors 377 and 378 to conductors 391 and 392 to hold operated the pad control relay of the trunk or line to which the cord C2 is connecting the trunk circuit IT2.

If the calling operator operates the ringing key RF of cord C1 to recall the answering operator, the ringing source 4 is connected across the tip and ring conductors of plug FP thereby operating ring-up relay 61 of outgoing trunk circuit OT1. Relay 61 connects relay 62 in series with condenser 63 and relay 62 is also operated by the ringing current. Relay 62 closes a circuit for operating relay 56. Relay 56 opens the talking connection between jack J1 and trunk T1, connects resistor 55 across conductors 101 and 102, closes a circuit including resistor 92 for holding relay 70 operated, and closes a circuit for operating relay 83. Relay 83 opens one of the circuit paths for holding relay 70 operated. When the ringing key is restored, relays 61, 62, 56 and 83 release. Relay 56 opens the circuit which it closed for holding relay 70 operated and, since relay 83 is slow in releasing, relay 70 releases until relay 83 releases. The release and reoperation of relay 70 causes the release and reoperation of signaling relay 210. The release and reoperation of relay 210 causes the release and reoperation of relays 225 and 371. Being slow in releasing, relay 226 remains operated. The release of relay 371 closes a circuit for operating relay 374. Relay 374 closes a circuit through the low resistance winding of relay 382 and sleeve conductor 393 in parallel with the high resistance winding of relay 394. Relay 382 operates, and locks independent of relay 374. When relay 371 reoperates, relay 374 releases, and the winding of relay 383 is connected to interrupter 384. Relay 383 is thereupon alternately operated and released under the control of interrupter 384. Each operation of relay 383 closes a holding circuit for relay 382 and disconnects the low resistance winding of relay 382 from sleeve conductor 393. The sleeve conductor 393 is thereby alternately connected to and disconnected from the low resistance winding of relay 382 causing the flashing of the lamp FL of cord C2 to recall the answering operator. When the operator reoperates the talking key of cord C2, the sleeve conductor 393 is connected to the position circuit PC2 thereby increasing the resistance in series with conductor 393 to cause the release of marginal relay 382. The release of relay 382 disconnects relay 383 from interrupter 384.

If the answering operator wishes to signal the calling operator, operation of ringing key RK of cord C2 connects a battery of high enough voltage to the tip conductor of plug RP to cause the operation of marginal relay 387 which is connected to ground through the winding of relay 380 or through resistor 379. The operation of relay 387 opens the circuit which includes conductor 364 and the winding of relay 240 of two-way trunk circuit TWT2. The release of relay 240 disconnects battery and reconnects ground to retard coil 209 thereby causing the release of supervisory relay 80 of outgoing trunk circuit OT1. The release of relay 80 causes the reoperation of relay 28 of cord C1 and relay 28 lights the supervisory lamp FL. By alternately operating and releasing the ringing key of cord C2 the lamp FL of cord C1 is flashed.

If the answering operator disconnects cord C2 from jack J7, relays 394 and 395 release but relay 396 is held operated under control of relay 226 of two-way trunk circuit TWT2. The release of relay 395 causes the release of relays 240 and 80 to light the supervisory lamp FL of cord C1 as a disconnect signal.

When the calling operator disconnects from jack J1, relays 58 and 64 release. If operated, relay 57 also releases. Relay 64 releases relays 75, 80 and 81. Relay 75 releases relays 70 and 59 and reconnects the talking conductors of trunk T1 to conductors 121 and 122 of two-way trunk circuit TWT1. The release of relay 81 releases relay 65, disconnects the busy ground potential from conductors 123 and 133 and reconnects the winding of relay 59 to sleeve conductor 123 of the two-way trunk circuit TWT1. The release of relay 59 reconnects the condenser 54 and resistor 55 across conductors 101 and 102 and disconnects these conductors from jack J1. The release of relay 65 reconnects the contact of signaling relay 110 to conductor 124 of two-way trunk circuit TWT1, opens the short circuit around resistor 67 to restore to normal the biasing circuit through the upper winding of relay 70, and opens the circuit of busy lamp BL1. The release of relay 70 disconnects battery from and reconnects ground to retard coil 109 and the windings of relay 110 to cause the release of signaling relay 210 of signaling circuit CS2.

When signaling relay 210 releases, it causes the release of relay 225 of two-way trunk circuit TWT2 and the release of relay 371 of incoming trunk circuit IT2. The release of relay 371 causes the operation of relays 374 and 382. With the winding of relay 382 connected to sleeve conductor 393, the supervisory lamp RL of cord C2 is lighted as a disconnect signal. The release of relay 225 causes the release of relay 226 and the release of relay 226 disconnects holding ground potential from conductors 243, 318, 323, 340 and 363, thereby causing the release of relay 310 of selector TS2, the release of relay 357 of selector AS2, and the release of relays 374 and 396 of trunk circuit IT2. The release of relay 396 connects ground at a front contact of relay 395 to conductor 363 to mark trunk circuit IT2 as busy until the operator disconnects cord C2 from jack J7. When the cord C2 is disconnected from jack J7, relays 394 and 395 release. The release of relay 310 of selector TS2 closes a circuit for operating release magnet 315, whereupon the shaft and brushes of switch TS2 are returned to normal. When the shaft reaches normal position, springs 316 are actuated to release the magnet 315. The release of relay 357 of selector AS2 closes a circuit for operating release magnet 359 to restore the shaft and brushes to normal. The vertical off-normal springs 344 are actuated when the shaft reaches normal to release magnet 359.

If, on the call described above, the selector TS2 or the selector AS2 should find all trunks in the selected level busy, the "11th rotary step" springs 317 or 349 are actuated, thereby connecting interrupter 300 or interrupter 350 to conductor 244 to alternately operate and release relay 240. Each time relay 240 operates and releases it causes the operation and release of relay 110; and relay 110 causes the operation and release of relay 80. If the dial has not been disconnected from the cord C1, each operation and release of relay 80 causes the operation and release of relay 42, and the dial pilot lamp is thereupon flashed as an all-trunks-busy signal. If the dial has been disconnected, the alternate operation and release of relay 80 causes the alternate release and reoperation of relay 28 thereby flashing lamp FL of cord C1 as an all-trunks-busy signal.

Assume next that an operator at position PC2 answers a call with plug RP. The talking key having been operated, and the position circuit being idle, relay 410 is operated by the energization of its right winding. Relay 410 closes a circuit for operating relay 420 of the position circuit and connects the operator's telephone set to both ends of the cord. Relay 420 closes a circuit through the locking winding of relay 410. Assume further that the operator connects plug FP to jack J5. Although the cord and position circuits C2 and PC2 are arranged so that the dial D2 may be connected to either end of the cord, only the relays and connections necessary for dialing over the front plug FP are shown in the drawings. Upon connection of plug FP to jack J5, a circuit is closed through the sleeve conductor of plug FP and contacts of key TK for operating relays 421 and 422 of the position circuit and sleeve relay 254 of the outgoing trunk circuit OT2. The lower winding of relay 254 is a low resistance winding so that the current is sufficient to operate the marginal relay 422. Relay 421 closes a circuit for operating relay 423 and relay 422 closes a circuit for lighting the cord supervisory lamp FL. Relay 423 connects the tip and ring conductors of plug FP to the operator's telephone. With the dial key DK operated to the front position and relay 423 operated, relay 424 of the dial circuit DC2 operates. Relay 424 disconnects the tip and ring conductors of plug FP from the operator's telephone set and closes a circuit for operating relay 425. Relay 425 closes a circuit for lighting the dial pilot lamp DP and a circuit which includes back contacts of relays 428, 435, 436 and 431 for operating relay 426. Relay 426 closes a circuit for operating relay 427. Relay 427 closes a circuit for operat- relay 428. Relay 428 locks under control of relays 425, 435, 436 and 431 and opens the operating circuit of relay 426.

In the outgoing trunk circuit OT2, the operation of relay 254 closes a circuit for operating relay 267. Relay 267 locks under control of relay 269 and closes a circuit for operating relay 257. Relay 257 closes a circuit for lighting the busy lamps such as BL5; closes circuits for operating relays 264, 269 and 276; closes a circuit including the inner lower contact of relay 278 for operatively energizing the upper winding of relay 270; connects ground to the sleeve conductors 223 and 233 of the two-way trunk circuit TWT2; disconnects the winding of relay 256 from the sleeve conductor 223; disconnects the front contact of signaling relay 210 of composite signaling circuit CS2 from conductor 224 and the windings of relays 228 and 225 of two-way trunk circuit TWT2; and connects the front contact of signaling relay 210 to the winding of supervisory relay 255. The operation of relay 264 closes circuits for operating relays 259 and 260, connects ground to sleeve conductor 223, and connects ground through its middle lower front contact, resistor 265, back contacts of relays 279 and 266, and conductor 252 to the ring conductor of jack J5. The ground connected to conductors 223 and 233 guards against seizure of trunk T1 by any of the selectors such as AS2 to which this trunk is accessible and operates relay 229. Relay 221 locks to this ground and disconnects the windings of relays 225 and 228 from conductor 224. The operation of relay 269 opens the locking circuit of relay 267 but relay 267 holds under control of relay 254. It is the function of slow-release relay 267 and slow-operate relay 269 to prevent the momentary release of relay 270, if relay 270 operates before the plug FP is fully seated in jack J5. The operation of relay 270 connects signaling battery B2, through resistor 275, front contact of relay 270, retard coil 209, middle winding of relay 210, upper windings of retard coils 206, to the upper conductor of trunk T1 to cause the operation of signaling relay 110 of signaling circuit CS1. The operation of relay 259 opens the normally closed circuit for operating pad control relay 203, closes a circuit for holding the busy lamp BL5 lighted, and closes a network comprising ballast lamp 271, resistors 272, 273 and 274 and the middle biasing winding of relay 270. The ballast lamp has a high temperature coefficient of resistance and variations in its resistance due to variations in the voltage of signaling battery B2 affect the energization of the middle winding of relay 270 so as to compensate for changes in the voltage of the signaling battery. The use of the ballast lamp, network of resistors, and biasing winding of relay 270 to compensate for changes in the voltage of battery B2 is disclosed and claimed in the aforementioned Patent No. 2,174,006, granted to O. R. Miller. The operation of relay 260 disconnects relay 268 and conductor 290 of two-way trunk circuit TWT2 from the windings of retard coil 280 and talking conductors 201 and 202 and connects these talking conductors through the windings of relays 263 and 277 to the winding of pad control relay 203.

When the circuit of slow-to-release relay 426 is opened by the operation of relay 428, as herein before described, relay 426 remains operated for an interval long enough for relay 269 of trunk circuit OT2 to have operated, at which time relay 269 opens a normally closed short circuit around the winding of relay 278 and closes a short circuit around resistor 282. Relay 278 is thereupon operated by the current in a circuit through resistor 281, inner upper back contact of relay 266, conductor 251, tip conductors of jack J5 and plug FP, contacts of key RK, front contact of relay 410, front contact of relay 424, back contact of relay 432, front contact of relay 427, winding of relay 429, and the winding of relay 427. Relay 427 is held operated and relay 429 is operated by the current in this circuit. Relay 429 closes a circuit for operating relay 431. Relay 431 closes a circuit for operating relay 432 and closes a circuit from battery through resistor 434, upper front contact of relay 431, impulse contacts of dial D2, winding of relay 435, back contact of relay 426, front contacts of relays 424 and 410, ring conductor of plug FP, conductor 252, back contacts of relays 266 and 279 and through resistor 265 to ground at a front contact of relay 264. Relay 432 opens the circuit through the windings of relays 427 and 429 and connects the tip conductor of plug FP through resistor 433 to battery to hold relay 278 operated. Although relays 427 and 429 release, relay 431 is held by relay 432 and relay 432 is held under control of the dial key. Relay 431 holds relays 420 and 424. The operation of relay 278 closes a circuit for operating relay 279 and opens the operating circuit for relay 276. Relay 279 locks under control of relay 269 and connects the operating, upper winding of relay 270 in series with conductor 252 and the impulse contacts of the dial. Since the operation of relay 278 disconnects the battery at its inner lower back contact from the operating winding of relay 270 and the release of relay 276 disconnects the battery at its front contact from this winding of relay 270, relay 270 is now ready to respond to impulses created by the operation of the dial. The lower biasing winding of relay 270 is connected in series with the dialing battery so as to compensate for variations in the voltage of this battery.

The required toll route number is dialed and so also are the local office code and number of the called subscriber if the called subscriber's line is in a dial office. The impulse relay 270 repeats the dial impulses over trunk T1 to relay 110 of signaling circuit CS1. Each time the dial is moved off normal, relay 437 operates to hold relays 432 and 431 operated independent of the dial key. When dialing is completed and the dial key restored to normal, relay 437 releases, relays 432, 431, 424 and 425 release in succession and the plug FP is thereby reconnected to the operator's telephone set. While the talking key is operated, supervisory signals are received over the sleeve conductor by marginal relay 422 and relay 422 controls supervisory lamp FL. When the talking key is restored to normal relays 410, 420, 421, 422 and 423 release and lamp FL is controlled by the supervisory relay 255 of trunk circuit OT2. The release of relay 432 opens the circuit through resistor 433 and conductor 251 to cause the release of relay 278 and thereby reconnect battery through its lower contact to hold relay 270 before the release of slow-to-release relay 431 opens the dialing circuit. The release of relay 278 closes a circuit including a front contact of relay 279 for operating relay 266 and recloses the circuit for operating relay 276. Relay 266 disconnects conductor 251 from the winding of relay 278, disconnects conductor 252 from the armature of relay 279, disconnects conductors 221 and 222 of two-way trunk circuit TWT2 from conductors 201 and 202, opens the repeater termination comprising condenser 283 and resistor 284 normally bridged across conductors 201 and 202, and closes the talking connection between trunk T1 and jack J5. The pad control relay 203 is connected through windings of relays 263 and 277, front contacts of relay 260, windings of retard coil 280 and front contacts of relay 266 to the talking conductors of cord C2, relay 203 being held operated in series with resistors 411 and 412 of the position circuit as long as the talking key is operated. When the talking key is restored, relay 203 is controlled by the character of the line connected to plug RP; if this line is a tributary line, relay 203 is held operated, but if this line is a toll line relay 203 releases and relay 204 operates to short-circuit pads P3 and P4.

The aforementioned operation of relay 110 upon seizure of outgoing trunk circuit OT2 closes a circuit for operating relay 128 of two-way trunk circuit TWT1. The operation of relay 128 closes a circuit for operating relay 125 in series with the line relay (not shown) of the associated toll route selector TS1. This circuit is traced from ground through the front contact of relay 110, back contact of relay 64, back contact of relay 65, back contact of relay 129, winding of relay 125, front contact of relay 128, conductor 90, thence in simplex through resistors 51 and 52, back contacts of relay 50, windings of retard coil 53, back contacts of relay 75, conductors 121 and 122, front contacts of relay 128, conductors 141 and 142 to the line relay (not shown) of selector TS1. Relay 125 closes a circuit for operating relay 126. Relay 126 connects holding ground potential to sleeve conductor 143, and opens the operating circuit of relay 128. Relay 128 holds through resistor 127 under control of relays 125 and 126. Relay 128 disconnects relay 129 from conductor 123 and connects ground to this conductor and to conductor 133 to guard against seizure of trunk T1 by an auxiliary toll route selector such as AS1. The connection of ground to conductor 123 also causes the operation of relay 59 to outgoing trunk circuit OT1. Relay 59 closes a circuit for operating relay 65; opens the repeater termination comprising condenser 54 and resistor 55; bridges relay 82 across the simplex circuit which includes resistors 51 and 52, as above traced; maintains the connection between the front contact of relay 110 and the winding of relay 125 after relay 65 operates; connects the winding of pad control relay 103 to ground at the back contact of relay 82; and makes any operation of relays 58 and 94 ineffective. Relay 65 closes a circuit for lighting the busy lamp BL1 and connects battery through resistor 60 and the winding of relay 57 to the sleeve of jack J1 as a busy indication.

The first train of dial impulses transmitted by relay 270 are repeated by relay 110 through the winding of relay 125 to selector TS1. The selector TS1 is thereby directively operated to select a desired group of trunks and an idle trunk therein. The next train of impulses are transmitted to an auxiliary toll route selector AS1; and selector AS1 is operated to select a desired group of trunks and an idle trunk therein. If the selected trunk terminates at an operator's position, an answering signal is transmitted when an operator answers the call. If the selected trunk leads to a local or community dial office, additional trains of impulses are received by relay 110 and repeated through the selected trunk. The connection of ground to conductor 144 when the call is answered operates relay 140. The operation of relay 140 connects battery through resistor 73 to retard coil 109 causing the operation of relay 210 of signaling circuit CS2. Relay 210 closes a circuit for operating relay 255. Relay 255 opens the circuit through the lower, low resistance winding of relay 254 so as to increase the resistance of the circuit through sleeve conductor 253 and thereby extinguish the cord supervisory lamp as an answering signal. Relay 82, which is connected across the simplex by the operation of relay 59 as hereinbefore described, operates if the simplex is unbalanced due to the call being extended through selectors TS1 and AS1 to a toll line; but does not operate if the simplex is balanced due to the call being extended to a tributary line or switching trunk. If relay 82 operates, it causes the release of relay 103 and the pads P1 and P2 remain in the talking connection; but if relay 82 does not operate, relay 103 operates in a circuit including a front contact of relay 59; and the pads P1 and P2 are short-circuited.

If the operator at position PC2 wishes to recall an answering operator, operation of the ringing key connects battery of a high enough voltage to the tip conductor of plug FP to operate relay 263. Relay 263 closes a circuit for operating relay 258 and a circuit for holding relay 270. When the ringing key is restored, relay 263 releases. The release of relay 263 causes the release of relay 258. Since relay 258 is slow in releasing, the operating circuit of relay 270 is momentarily opened; and relay 270 releases to send a recall signal. An answering operator may recall the calling operator, in which case relay 140 releases due to the disconnection of ground from conductor 144. The release of relay 140 causes the release of relays 210 and 255. The release of relay 255 causes the lighting of the supervisory lamp FL of cord circuit C2.

If the calling operator wishes to reconnect the dial to the trunk OT2 after relay 266 has operated, the talking and dial keys are reoperated. Relays 410, 420, 421, 422 and 423 are reoperated when the talking key is operated; and relays 424, 425, 426, 427 and 428 are reoperated when the dial key is reoperated. The operation of relay 428 causes the release of relay 426; relay 427 holds and relay 429 operates through the tip conductor of plug FP in series with the windings of relays 263 and 203. Relay 263 is marginal and does not operate in this circuit since the voltage of the battery connected to the winding of relay 427 is not as large as that supplied by the ringing key. The operation of relay 429 causes the successive operation of relays 431 and 432 and the release of relay 427, thereby again connecting battery through resistor 434 to the ring conductor of plug FP, thence through conductor 252, front contact of relay 266, lower winding of retard coil 280, front contacts of relay 260, lower winding of relay 277 and winding of relay 203 to ground. Relay 277 operates and it locks through its upper winding under control of relays 279 and 278. The operation of relay 277 causes the release of relay 266. Relay 266 recloses the circuit from battery through resistor 433 and conductor 251 for operating relay 278. With relay 278 reoperated, the upper winding of relay 270 is again under the operative control of the impulse contacts of the dial.

When the operator disconnects plug FP from jack J5, relay 254 releases causing the successive release of relays 267 and 257. Relay 257 releases relays 270, 264 and 269 and also relays 255 and 276 if operated. Relay 264 releases relays 259 and 260. Relay 269 releases relays 279 and also relay 278 if operated. The release of relay 259 extinguishes the busy lamps, and the release of relay 260 reconnects the signaling conductor 290 through the simplex resistors 261 and 262 to the windings of retard coil 280. The release of relay 270 disconnects signaling battery from the upper conductor of trunk T1 causing the release of relay 110. The release of relay 110 causes the release of relays 125, 126 and 128 of two-way trunk circuit TWT1. The release of relay 126 disconnects holding ground potential from conductor 143 thereby causing the release and return to normal of selectors TS1, AS1 and the release of all succeeding trunk and selector circuits.

If on a call incoming from outgoing trunk circuit OT1 over intertoll trunk T1 to the two-way trunk circuit TWT2, the auxiliary toll selector AS2 is directively operated to select a group in which the terminals are connected to ring-down toll lines, the left-hand contacts of normal-post springs 358 are actuated on the selected level to close a circuit for operating relay 336 of the inter-switch trunk circuit IST2. Relay 336 connects conductor 334 to the winding of relay 327 and connects the winding of relay 325 through the windings of retard coil 320 and through conductors 321 and 322 to ground at the front contact of signaling relay 210. Relay 325 operates, closing a circuit for operating relay 326. Relay 326 closes a circuit through conductor 336 for operating the start relay 337 of a common timing circuit. As soon thereafter as ground is connected through interrupter A to conductor 338, relay 329 operates. Relay 329 locks under control of relay 328 to ground at a front contact of relay 326, connects battery through resistor 330 to conductor 334, and connects ringing-current source 331 through condenser 332 to conductor 322 thereby transmitting a ringing tone to the calling operator. Two seconds after interrupter A closes the circuit for operating relay 329, interrupter B connects ground to conductor 339, operating relay 328. Relay 328 locks to ground at relay 326, releases relay 329, disconnects ground from conductor 336, and disconnects conductor 338 from the contact of relay 329. The release of relay 329 opens the ringing tone circuit, disconnects battery from conductor 334, and reconnects this conductor to the winding of relay 327. With relay 336 operated and relay 327 non-operated, ground is connected to conductor 324 thereby causing the operation of relay 240 of two-way trunk circuit TWT2. Relay 240 causes the operation of relay 110 of the two-way trunk circuit TWT1 and relay 80 of the outgoing trunk circuit OT1 to give the calling operator a signal to indicate that the called toll line is being signaled.

The selector AS2 having hunted for and found an idle line in the selected group, relay 357 operates and relays 351 and 352 are released as hereinbefore described. With relay 357 operated, the ground at the front contact of relay 226 of two-way trunk circuit TWT2 is extended through brush 347 and conductor 503 to operate relay 508 of the ring-down line circuit RD1. Relay 508 connects battery through resistor 509 to the sleeve of jacks J9 and J10 to mark the line RDL as busy and connects battery to the winding of relay 529. Relay 529 operates, closing a circuit for operating relay 523. Relay 523 opens the repeater termination comprising condenser 521 and resistor 522 normally bridged across conductors 501 and 502; closes a circuit for operating the busy signal BS10, and opens the normally closed circuit through resistor 524 for holding relay 583 operated. With relay 508 operated and with relays 336 and 329 of the interswitch trunk circuit INST2 operated, battery is connected through resistor 330, conductor 334, top back contact of the "11th rotary step" springs 349, front contact of relay 357, brush 348, conductor 504, front contact of relay 508, front contact of the normally operated relay 591 to the winding of relay 592. Relay 592 operates, connecting the ringing-current source 593 to the repeating coil RC5 thereby transmitting ringing current over the ring-down line RDL to signal an operator at the distant toll office. When relay 329 releases at the end of a two-second ringing interval, battery is disconnected from conductor 334, releasing relay 592 to disconnect ringing source 593. With relays 357 and 508 operated, the simplex path from the ground at the front contact of relay 210 is extended through conductors 321 and 322, brushes 345 and 346, conductors 501 and 502, windings of retard coil 507, front contacts of relay 508, through resistors 511 and 512 to battery. Resistors 511 and 512 are equal in resistance since the associated ring-down line is equipped with pads. Relay 515, bridged across the simplex, does not operate, since the simplex is balanced; therefore relay 583 releases and relay 584 operates so that pads P9 and P10 are short-circuited. (On a call from a tributary line the simplex is not balanced so that relay 515 operates, relay 583 is held operated, relay 584 does not operate, and the pads are not short-circuited.) The pad control relay 268 in the outgoing trunk circuit OT2 does not operate since the simplex is balanced, therefore the pad control relay 203 releases and relay 204 operates to short-circuit pads P3 and P4. If and when a ringing signal is received from the distant toll office, relay 590 operates, causing the release of relay 591. The release of relay 591 connects battery through conductors 504 and 334 to operate relay 327 of the interswitch trunk circuit IST2. Relay 327 disconnects conductor 324 from the ground at relay 336 thereby causing the release of relay 240. When the ringing signal ends, relay 590 releases, relay 591 reoperates, relay 327 releases and relay 240 reoperates. The release and reoperation of relay 240 causes the release and reoperation of supervisory relay 80 of outgoing trunk circuit OT1 and the lighting of the calling operator's supervisory lamp FL as hereinbefore described.

If a toll operator connects plug FP of cord C2 with outgoing jack J10, relay 529 is operated. Relay 529 closes a circuit for operating relay 523. Relay 523 connects battery to conductor 518 to operate relay 506 and the busy signal BS 10, opens the repeater termination, and opens the normally closed circuit for holding relay 583 operated. Relay 506 connects ground to conductor 503 to mark trunk circuit RD1 busy in the banks of selectors such as AS2. Operation of the ringing key of cord C2 connects battery of a high enough voltage to the tip conductor of plug FP to operate relay 517. Relay 517 short-circuits conductors 581 and 582 and connects the winding of relay 592 to and through the tip of plug FP to the ringing key battery to operate relay 592. Relay 592 connects ringing source 593 to repeating coil RC5 to transmit a ringing signal over line RDL. If a ringing signal is received over the line RDL, relay 590 operates and relay 591 releases, thereby closing a circuit through the upper winding of relay 520. Relay 520 operates, closing a connection from the sleeve conductor of plug FP, through conductor 519, the lower front contact of relay 523, back contact of relay 528, winding of relay 527, to ground at the middle upper front contact of relay 520. Relay 527 operates and locks independent of relay 520. When the ringing signal ceases, relay 590 releases, relay 591 reoperates and relay 520 releases. Relay 527 connects interrupter 530 to the winding of relay 528 which is thereupon alternately operated and released. Each operation of relay 528 closes a holding circuit for relay 527 and disconnects the winding of relay 527 from sleeve conductor 519. Each time the low resistance winding of relay 527 is connected through conductor 519 to the sleeve of plug FP, the resistance of the circuit through the cord supervisory lamp FL is decreased sufficiently to light the lamp. The flashing of lamp FL continues until the talking key of cord C2 is operated, whereupon the resistance in the circuit through conductor 519 is increased to release marginal relay 527 without releasing relay 529.

On a call incoming over the ring-down toll line RDL, relay 590 is operated by ringing current, releasing relay 591 and operating relay 520 as a seizure signal. Relay 520 connects the winding of relay 525 in series with the signal lamps such as AL9, lighting the signal lamps and operating relay 525. Relay 520 also connects battery to conductor 518 to operate the busy signals such as BS10 and to operate relay 506. Relay 506 connects ground to conductor 503 to mark the trunk circuit RD1 busy in the banks of selectors having access thereto. Relay 525 locks through resistor 526 under control of relay 523 and connects battery directly to the signal lamps. When the seizure signal ceases and relay 591 reoperates, relay 520 is held through its lower winding under control of relay 523. When the call is answered by connecting plug RP to jack J9, battery is connected to the sleeve conductor 519 to operate relay 529. Relay 529 closes a circuit for operating relay 523. Relay 523 extinguishes lamp AL9, releases relays 520 and 525, opens the normally closed circuit for operating relay 583, opens the repeater termination and connects battery to conductor 518 to maintain the busy conditions. Operation of the ringing key of cord C2 transmits a rering signal as described above.

When the plug of a cord such as C2 is connected to jack J9 on an incoming call or to jack J10 on an outgoing call, the pad control relay 583 is held operated, as long as the talking key is operated, in series with the talking conductors of trunk RD1 and the resistors 411 and 412 of the cord. When the talking key is restored to normal, relay 583 is controlled by the trunk or line circuit to which the other end of cord C2 is connected. If relay 583 remains operated, relay 584 does not operate and the pads P9 and P10 remain in the talking circuit; if relay 583 releases, relay 584 operates and the pads are short-circuited.

If on a call incoming over intertoll trunk T1 from jack J1 to the two-way trunk circuit TWT2, the toll route selector TS2 and the auxiliary toll route selector AS2 are directively operated to select a group in which the terminals are connected to two-way trunks from a community dial office of the link type, the right-hand contacts of springs 358 are actuated to connect ground from the lower contact of the "11th rotary step" springs 349, through the upper back contact of relay 353, right front contact of springs 358, front contact of relay 352, top back contact of springs 349, conductor 334, back contacts of relays 336 and 327, conductor 324, brush 314 of selector TS2, front contact of relay 310, back contact of springs 317, and conductor 244 to the winding of relay 240. Relay 240 disconnects ground from, and connects battery through resistor 275, retard coil 209, and winding of relay 210 to the tip conductor of trunk T1 to operate relay 110 of signaling circuit CS1. Relay 110 closes the circuit hereinbefore described for operating relay 80 of the outgoing trunk circuit OT1. The operation of relay 80, before dialing has been completed causes the release of relays 42, 43, 46 and 44 to extinguish the dial pilot lamp DP as a stop dialing signal. Relay 47 is held operated through a front contact of the dial key. The release of relay 46 opens the circuit through the lower winding of relay 42 thereby causing the reoperation of relays 42, 43 and 44. Relay 46 does not reoperate since resistor 87 is included in the sleeve circuit. With relay 47 operated and relay 46 non-operated, the reoperation of relay 44 does not light the lamp DP. After selection of the level and actuation of the right-hand contacts of springs 358 to extinguish the dial pilot lamp as a stop dial signal, selector AS2 hunts, as hereinbefore described, for an idle trunk in the selected level. Upon finding an idle trunk, relay 357 operates, connecting the ground at the front contact of signaling relay 210, through the simplex path hereinbefore traced to brushes 345 and 346, thence through conductors 601 and 602, the windings of retard coil 600 of the selected trunk circuit CDT1, and through the windings of relays 610 and 611 to battery. Relays 610 and 611 are operated and relay 225 of two-way trunk circuit TWT2 is held operated by the current in this circuit. When relay 357 operates, the connection from the winding of relay 240 of trunk circuit TWT2 is extended through brush 348, conductor 604, and back contacts of relays 621 and 616 to ground; so that relay 240 is held operated after relays 351 and 352 release, thereby maintaining the stop dial signal at position PC1. Relay 610 closes circuits for operating relays 612, 614 and 615. Relay 612 closes a circuit for lighting the busy lamps such as BL9 associated with outgoing jacks to which trunk circuit CT1 is connected and connects battery through resistor 617 and the upper winding of sleeve relay 630 to the sleeve of the associated jacks at the toll board to mark the trunk CT1 busy. Relay 614 locks through its upper winding, sleeve conductor 603 and brush 347 to ground at the front contact of relay 226 of two-way trunk circuit TWT2; disconnects ground from the lower winding of relay 630 to prevent operation of this relay if an operator should disregard the busy indication and plug into a jack to which circuit CT1 is connected; disconnects the winding of relay 631 from conductor 619 so as to prevent false operation of relay 631; and short-circuits the upper winding of relay 620 thereby causing the operation of the marginal line relay 701 in the community dial office. Relay 615 locks through its upper winding to ground on sleeve conductor 603 and disconnects this conductor from the contacts of relays 612, 631 and 633. The lower contacts of relay 615 facilitate testing of this relay.

Signaling over trunk CDT between the interconnected toll and community dial offices consists of marginal signals and polarized signals. While trunk CDT is idle, there is a closed circuit through the winding of line relay 701 of the trunk circuit CDT2 in the community dial office, in series with the left windings of repeating coil RC9, the conductors of trunk CDT, the right windings of repeating coil RC6 of trunk circuit CDT1 in the toll office and both windings of relay 620. Relay 620 is polarized and does not operate since the current in this normally closed circuit is in the non-operating direction. Relay 701 is marginal and does not operate in series with both windings of relay 620 since the upper winding of relay 620 has a high resistance. When the upper winding of relay 620 is short-circuited by the above-mentioned operation of relay 614, the current over trunk CDT is increased sufficiently to cause the operation of relay 701. Relay 701 closes a circuit for operating the slow-to-release relay 702. Relay 702 closes a circuit for operating relay 703, connects ground to conductor 743 to mark trunk circuit CDT2 as busy in the banks of selectors having access thereto, connects the winding of relay 709 to conductor 733 to mark the terminals of trunk CDT2 in the banks of trunk finders having access thereto, and closes a circuit for operating group relay 710. With relays 701 and 703 operated, the winding of polarized relay 704 is bridged across conductors 731 and 732. The operation of group relay 710, which is common to the lines connected to one level of terminals in the bank of a group of trunk finders, connects ground to the start conductor 711 to start the first idle finder in the group and connects ground to conductor 712 to mark the level of the line finder banks in which the terminals of trunk circuit CDT2 are located. For a disclosure of a finder circuit and its operation resulting from connection or ground to the start conductor, reference may be had to the patent of R. L. Stokely No. 1,799,654 granted April 7, 1931. When the brushes of a trunk finder TF engage the terminals to which conductors 731, 732 and 733 are connected, a circuit is closed through conductor 733 for operating relay 709 and for operating a relay (not shown) in the trunk finder circuit to stop the finder switch. Relay 709 closes circuits for operating relays 707 and 708. The operation of relay 707 causes a reversal of the current over trunk CDT and through the windings of polarized relay 620. Relay 708 opens the circuit for operating relay 707 but relay 708 is slow in operating so that relay 707 remains operated for an interval long enough to cause the operation of polarized relay 620 of trunk circuit CDT1 to indicate that a finder has connected the trunk CDT to a first selector. Relay 704 is connected through the upper brushes of finder TF to the windings of the line relay (not shown) of the associated incoming selector IS; but relay 704 does not operate since it is polarized and the current is in the non-operating direction. Reference may be had to pages 53 to 65 of the second edition of "Automatic Telephony" by Smith and Campbell for a complete description of the selectors IS and S1 and connector C in the community dial office. The operation of relay 620 causes the operation of relay 621. Relay 621 locks under control of relay 612, disconnects conductors 601 and 602 from repeating coil RC6 to prevent the transmission of dial tone from selector S1 in the community dial office to the calling operator, disconnects conductor 604 from the ground at the back contact of relay 616 and connects this conductor to ground at the front contact of relay 620. Since calls to trunk circuit CDT may come from intertoll trunks arranged for voice-frequency signaling, the dial tone is not transmitted because it would interfere with the receiving of dial impulses. When relay 620 releases due to the release of relay 707, it disconnects ground from conductor 604 causing the release of relay 240; and the release of relay 240 causes the successive release of relays 110 and 80 thereby short-circuiting resistor 87 to cause the reoperation of relay 46. The reoperation of relay 46 lights the lamp DP as a start-dialing signal.

The calling operator now dials the digits of the called subscriber's number, the dial impulses being successively repeated by relays 70 and 210 to cause the alternate release of relays 610 and 611 of trunk circuit CDT1. The release of relay 610 in response to the first impulse of a digit operates relay 613. Relay 613, being slow in releasing, remains operated until all of the impulses of a digit have been received by relay 610, and during each such interval relay 613 short-circuits the windings of relay 620 and the right windings of repeating coil RC6. The operation of relay 613 upon receipt of the first dial impulse of the first digit also closes a circuit through the lower winding of relay 616. Relay 616 operates and locks through its upper winding under control of relay 612. When relay 613 releases at the end of the first digit, it closes a short circuit around the winding of relay 621, causing the release of relay 621. Since relay 616 is operated, the release of relay 621 does not reconnect ground to conductor 604. Being slow in releasing, relay 612 remains operated during the response of relay 610 to dial impulses. Relay 611 repeats the impulses over trunk CDT to relay 701 of trunk circuit CDT2. The release of relay 701 in response to the first impulse of each digit closes a circuit for operating relay 705; and, being slow in releasing, relay 705 remains operated until all of the impulses of a digit have been received and during this interval short-circuits the winding of relay 704 and the windings of repeating coil RC7. Relay 701 repeats the impulses through conductors 731 and 732, the first train being effective to directively operate the selector IS. The last two trains of impulses control the operation of a connector C to establish connection with the called line. Ringing is automatically started by the connector and when the called subscriber answers, a relay in the connector, which relay is not shown in the drawings, is operated to reverse the current through conductors 731 and 732 to cause the operation of polarized relay 704. Relay 704 closes a circuit for operating relay 707 and relay 707 reverses the current over trunk CDT to operate relay 620. The operation of relay 620 connects ground to conductor 604 to reoperate relay 240 of trunk circuit TWT2. The operation of relay 240 causes the successive operation of relays 110 and 80. Since dialing has been completed, the operation of relay 80 causes the dial pilot lamp to be extinguished if the dial key has not been restored to normal; or, if the dial key is normal, causes the release of relay 28 of cord circuit C1 to extinguish the supervisory lamp FL. If the called subscriber replaces the receiver before the calling operator releases the connection, the reversal of current from connector C releases relay 704, causing the successive release of relays 620, 240, 110 and 80 and the reoperation of relay 28 to light lamp FL. When the calling operator disconnects plug FP from jack J1, the outgoing trunk circuit is restored to normal as hereinbefore described, relay 210 releases causing the release of relays 225, 610 and 611. The release of relay 610 causes the release of relay 612. Relays 614 and 615 are held operated through conductors 603, 340, 323, 318 and 243 until relay 226 of two-way trunk circuit TWT2 releases and disconnects holding ground potential from conductor 243. The selectors TS2 and AS2 are restored to normal as hereinbefore described. The release of relays 614 and 615 restores trunk circuit CDT1 to normal. The aforementioned release of relay 611 causes the release of relay 701 of trunk circuit CDT2. The release of relay 701 causes the release of relays 702, 703, 708 and 709. The release of relay 701 opens the loop across conductors 731 and 732, releasing the finder, selector and connector switches in usual and well-known manner.

Consider next a call answered by an operator at position PC2 with plug RP of cord C2, the called subscriber being in the community dial office and plug FP being connected to jack J11. Upon connection of plug FP to jack J11, relay 630 is operated by current through its lower, high resistance winding in series with relays 421 and 422 of position circuit PC2. Relay 421 also operates but relay 422 is marginal and does not operate at this time. Relay 421 closes a circuit for operating relay 423, lighting the supervisory lamp FL. Relay 630 disconnects the winding of relay 631 from the contact of relay 614, and closes a circuit for operating the slow-to-release relay 633. Relay 633 closes a circuit for operating relay 612, connects ground through a back contact of relay 615 to conductor 603 to guard against seizure of trunk circuit CDT1 by a toll route selector, and closes a circuit for operating relay 634. Relay 634 disconnects repeating coil RC6 from conductors 601 and 602 and connects the coil to the tip and ring conductors of jack J12, closes a circuit through the lower winding of relay 635 for operating relay 635, and short-circuits the high resistance upper winding of relay 620 thereby causing the operation of relay 701 of trunk circuit CDT2. Relay 634 also connects battery through resistor 639, and a back contact of relay 638 to the winding of relay 638; but relay 638 is marginal and does not operate at this time. The operation of relay 612 lights the busy lamps BL11 associated with the outgoing jacks and connects battery through high resistance 617 to the upper winding of relay 630. Relay 635 locks under control of relays 642 and 612 and also under control of relays 616 and 612. After relay 634 is operated, the bridge across the outgoing trunk conductors includes the middle lower front contact of relay 634 and a back contact of relay 638 or said front contact of relay 634 and the middle upper front contact of relay 635. With relay 423 operated, operation of the dial key of position circuit PC2 to the FRONT position, causes the operation of relay 424, disconnecting the tip and ring conductors of plug FP from the operator's telephone set and closing a circuit for operating relay 425. Relay 425 closes a circuit through the dial pilot lamp DP, but since relay 422 is not operated, this circuit includes resistor 415 and the current is not strong enough to light the lamp. Relay 425 also closes a circuit for operating relay 426. Relay 426 closes a circuit for operating relay 427, and relay 427 closes a circuit for operating relay 428. Relay 428 locks and opens the operating circuit of slow-to-release relay 326. When relay 426 releases, relay 427 is held operated and relay 429 is operated by the current in a circuit from battery through the windings of relays 427 and 429, upper front contact of relay 427, a back contact of relay 432, front contacts of relays 424 and 410, contacts of key RK, tip conductors of plug FP and jack J11, front contact of relay 634, upper left winding of repeating coil RC6, front contact of relay 634, to ground through the winding of relay 638. The current in this circuit also causes the operation of relay 638. Relay 429 closes a circuit for operating relay 431. Relay 431 closes a circuit for operating relay 432 and closes a circuit from battery through resistor 434, impulse contacts of dial D2, winding of relay 435, back contact of relay 426, front contacts of relays 424 and 410, ring conductor of plug FP and jack J11, front contact of relay 634, lower left winding of repeating coil RC6, a front contact of relay 638, and through the windings of relays 642 and 641 to ground; and relays 641 and 642 are operated by the current in this circuit. The operation of relay 432 opens the circuit through relays 427 and 429, causing the release of relays 427 and 429, closes a circuit for holding relay 431, and connects battery through resistor 433 to the tip conductor of plug FP and jack J11 to hold relay 638 operated. Relay 638, in addition to connecting the windings of relays 641 and 642 to the ring conductor of jack J11 in series with the impulse contacts of the dial, opens the operating circuit of relay 635; but relay 635 remains operated under control of relays 616 and 612. At this time the bridge across trunk CDT is traced from conductor 651 through the lower right winding of repeating coil RC6, lower winding of relay 620, a front contact of relay 634, the upper right winding of repeating coil RC6, a front contact of relay 635, a front contact of relay 634, and a back contact of relay 614, to conductor 652. Although the impulse circuit is now closed through the windings of relays 641 and 642, the bridge across the conductors of trunk CDT is not placed under control of the contacts of relay 641 until a start-dialing signal has been received by relay 620.

When relay 701 of trunk circuit CDT2 operates due to connection of plug FP with jack J11 as above described, it causes the operation of relays 702, 703 and 710, and the operation of a finder switch TF. When the finder finds the calling trunk CDT2, relays 709 and 708 are operated; and relay 707 is operated and then released to cause the operation and release of relay 620 of trunk circuit CDT1. The operation of relay 620 closes a circuit for operating relay 621 and relay 621 locks under control of relay 612. When relay 620 releases, relay 613 operates to close an operating circuit through the lower winding of relay 616. Relay 616 locks through its upper winding under control of relay 612, closes a short circuit around the winding of relay 621 to cause the release of relay 621, and opens the locking circuit through the lower winding of relay 635. When relay 621 releases, relay 613 releases. With the operating circuit of relay 635 opened by the operation of relay 638, the locking circuit through the lower winding of relay 635 opened by the operation of relay 616, and the locking circuit through the upper winding of relay 635 opened by the operation of relay 642, relay 635 releases thereby closing the impulse bridge across trunk CDT; this bridge is traced from conductor 651 through the front contact of relay 641, back contact of relay 635, front contact of relay 634, and back contact of relay 614, to conductor 652. With relay 620 released and relay 616 operated, ground at the back contact of relay 620 is connected through the middle lower front contact of relay 633 to the low resistance upper winding of relay 630 thereby increasing the current in the sleeve conductor sufficiently to cause the operation of marginal relay 422 in the position circuit PC2. Relay 422 closes a short circuit around resistor 415 thereby lighting lamp DP as a start-dial signal. The calling operator now dials the number of the called subscriber. The dial impulses are repeated by relay 641 over trunk CDT to relay 701 and relay 701 repeats the impulses to the selector and connector switches to establish connection with the called line. The condenser 643 and resistor 644 are bridged across the contacts of relay 641 during dialing to protect these contacts from excessive sparking. When dialing is completed and the dial key is released, relays 432, 431, 424 and 425 release in succession and the plug FP is reconnected to the operator's telephone set. When relay 432 releases it opens the circuit through resistor 433 to cause the release of relay 638. The release of relay 638 disconnects relays 641 and 642 from the ring conductor of jack J11, reconnects the repeating coil across conductors 651 and 652, and reoperates relay 635 to hold the lower winding of relay 620 bridged across conductors 651 and 652. To control the pads of the line or trunk with which plug RP is connected, the battery at the inner lower front contact of relay 634 is connected through resistor 639 to the tip conductor of plug FP and through resistor 636 and a front contact of relay 635 and a back contact of relay 638 to the ring conductor of plug FP.

When the called subscriber answers, relay 704 is operated. Relay 704 causes the operation of relay 707 and the operation of relay 707 reverses the current over trunk CDT to operate relay 620. The operation of relay 620 opens the circuit through the upper low resistance winding of relay 630, causing the release of marginal relay 422, if the talking key of cord C2 is operated, and the lighting of the DP lamp if the dial has not been disconnected from the cord. If the talking key is normal, the increase in the resistance of the sleeve circuit extinguishes lamp FL. An all-trunks-busy condition encountered by the selector in the community dial office or a line-busy condition encountered by the connector effects a periodic operation and release of relays 704, 707 and 620 to cause a flashing of lamp DP or lamp FL. When the called subscriber replaces the receiver, relays 704, 707 and 620 release and the lamp FL is lighted as a disconnect signal.

When the calling operator disconnects plug FP from jack J11, relays 630, 633, 612, 634, 635 and 616 release and the busy conditions are disconnected so that the circuit is ready for use on another call. The release of relay 634 opens the short circuit around the upper winding of relay 620 causing the release of relay 701 and the return of trunk circuit CDT2 and the switches in the community dial office to normal as hereinbefore described.

If a calling subscriber in the community dial office is connected through a line finder LF1 and selector S1 to the trunk circuit CDT2, relay 720 operates in series with the calling subscriber's line. Relay 720 connects holding ground potential to conductor 743 and closes circuits for operating relays 707 and 721. Relay 707 interchanges the connections between the windings of relay 701 and the conductors of trunk CDT, thereby reversing the current over these conductors to operate relay 620. Relay 620 closes a circuit for operating relay 631. Relay 631 closes a circuit for lighting the answering lamp AL12, connects ground through a back contact of relay 615 to conductor 603 to guard against seizure of trunk circuit CDT2 by a toll route selector, and closes a circuit for operating relay 632. Relay 632 operates relays 633 and 612. Relay 612 lights the multiple busy lamps BL11 and closes a circuit including a front contact of relay 631 for operating relay 616. Relay 616 locks under the sole control of relay 612. When a toll operator answers by connecting plug RP of a cord C2 to jack J12, relay 630 operates, releasing relays 631 and 633. Relay 632 holds under control of slow-to-release relay 633 until relay 633 releases. When relay 633 releases, it causes the release of relay 632, and relay 632 closes the operating circuit of relay 633 to ground at a front contact of relay 630. Being slow in releasing, relay 612 does not release while relay 633 is released. With relay 633 operated and relay 632 released, relay 634 is operated to connect the repeating coil RC6 to answering jack J12 and to short-circuit the upper winding of relay 620 to cause the operation of relay 701. Relay 701 closes a circuit for holding relay 721 so that the connection through switches LF1 and S1 is maintained under joint control of the calling subscriber and the answering toll operator.

When the calling subscriber replaces the receiver, relays 720, 707 and 620 release. The release of relay 620 connects ground to the low resistance winding of relay 630 to light the supervisory lamp RL. When the operator disconnects plug RP from jack J12, relays 630, 633, 612, 634 and 616 release. The release of relay 634 opens the short circuit around the upper winding of relay 620 to release relay 701. The release of relay 701 causes the release of relay 721 to disconnect ground from sleeve conductor 743 and thereby release the selector S1 and line finder LF1.

Assume next that the auxiliary toll route selector AS2 is seized by the toll route selector TS4 on a call incoming over trunk T4, and that the selector AS2 is operated to seize the two-way trunk circuit TWT2. It may also be assumed that the trunk circuits TWT4 and OT4 and the signaling circuit CS4 are similar to trunk circuits TWT2 and OT2 and signaling circuit CS2 and operate in the same manner that the last-mentioned circuits operate on a call incoming over trunk T1 as hereinbefore described. Upon seizure of the set of terminals to which conductors 231, 232, 233 and 234 are connected in the bank of selector AS2, the connection of ground through brush 347 to conductor 233 guards against seizure by another selector and effects the operation of relay 229. Relay 229 locks to conductor 233 independent of relay 228 and connects conductor 234 to and through conductor 224 and back contacts of relays 259 and 257 to the front contact of signaling relay 210 of signaling circuit CS2. Relay 230 is operated by the energization of its right winding in a circuit through the inner upper back contact of relay 228, conductor 290, thence in simplex through resistors 261 and 262, back contacts of relay 260, windings of retard coil 280, back contacts of relay 266, conductors 221 and 222, back contacts of relay 228, conductors 231 and 232, brushes 345 and 346, thence through the talking conductors of selectors AS2 and TS4 and through the trunk circuits TWT4 and OT4 to ground at the signaling relay (not shown) of signaling circuit CS4. Relay 230 connects battery B2 to retard coil 209 to operate signaling relay 110 at the other end of trunk T1. Dial impulses received over trunk T4 are repeated by relay 230 to relay 110 and the connection is thereby extended to a toll operator or to a called subscriber in a dial office. When the call is answered, the operation of signaling relay 210 connects ground through conductors 224 and 234, through selectors AS2 and TS4 to operate an answering supervisory relay in the two-way trunk circuit TWT4 and thereby transmit an answering signal over trunk T4 to the calling toll operator. Rering and disconnect signals may be transmitted through the selectors TS4 and AS2 between intertoll trunks T4 and T1. When the calling operator disconnects, the selectors TS4 and AS2 are restored to normal. The disconnection of ground from conductor 233 releases relay 229 and frees the trunk T1 for use on another call.

What is claimed is:

1. In a telephone system, a calling line, outgoing lines, means including a selector for connecting said calling line with any one of said outgoing lines, a signal relay for receiving signals incoming over said calling line and repeating said signals to said selector and to the selected outgoing line, a resistance pad associated with said calling line, a signal relay for said selected outgoing line, a simplex signaling circuit closed through the talking conductors of said selector for repeating signals received by said signal relay of the calling line to said signal relay of the selected outgoing line, means comprising a relay bridged across said simplex signaling circuit for controlling the inclusion of said pad in said connection, and means associated with said selected outgoing line for controlling said relay.

2. In a telephone system, lines, transmission pads and pad control relays associated with each of certain but not all of said lines, pad control resistors associated with each of said lines, means for connecting a calling one of said lines with another of said lines, said connection comprising talking conductors, signal receiving and signal sending relays for each of said lines, and a simplex circuit comprising the talking conductors of the connecting means between any two interconnected lines for repeating the signals received by a signal receiving relay of the calling one of the two lines to a signal sending relay of the other line, one of the pad control resistors of each of any two connected lines being included in one branch of the simplex circuit and another pad control resistor of each of said two connected lines being included in the other branch of the simplex circuit, the pad control relay of each of said certain lines being connected across the associated pad control resistors and across the branches of the simplex signaling circuit between the line and any other line with which it is connected.

3. In a telephone system according to claim 2, a signaling circuit comprising a non-talking conductor of the connecting means between two interconnected lines for repeating signals from a signal receiving relay of one of the lines to a signal sending relay of the calling one of the lines.

4. In a telephone system, a first line, a second line, transmission pads and a pad control relay associated with each of said lines, a third line, pad control resistors associated with each of said lines, means comprising talking conductors for connecting any two of said lines, signal receiving and signal sending relays for each of said lines, and a simplex circuit comprising the talking conductors of said connecting means for repeating signals from the signal receiving relay of the calling one of the two interconnected lines to the signal sending relay of the other of said two lines, one of the pad control resistors of each of said two lines being included in one branch of the simplex circuit and another pad control resistor of each of said two connected lines being included in the other branch of the simplex circuit, the pad control relay of each of said first and second lines being connected across the associated pad control resistors and across the branches of the simplex signaling circuit between the line and either of the other two lines, the pad control resistors of said first and second lines being adapted to maintain a balance between the two sides of said simplex circuit so as to prevent operation of the pad control relays of said first and second lines when these lines are connected, and the pad control resistors of said third line being adapted to unbalance the simplex signaling circuit between this line and either one of said first or second lines to cause the operation of the pad control relay of the line with which said third line is connected.

5. In a telephone system, groups of lines, transmission pads and pad control relays associated with certain of said lines, pad control resistors associated with each of said lines, selectors, means comprising a selector for connecting a calling line with a line in a desired one of said groups, signal receiving and signal sending relays for each of said lines, and a simplex circuit comprising the talking conductors of the selector through which two lines are connected for repeating the signals received by a signal receiving relay of the calling one of the lines to a signal sending relay of the other line, one of the pad control resistors of each of any two connected lines being included in one branch of the simplex circuit and the other of the pad control resistors of each of said connected lines being included in the other branch of the simplex circuit, the pad control relay of each of said certain lines being connected across the pad control resistors and the branches of the simplex signaling circuit between this line and a connected line for operation if the pad control resistors of the connected line are such as to unbalance the simplex, the pad control resistors of said certain lines being adapted to maintain a balance between the branches of the simplex and the pad control resistors of other lines being adapted to unbalance the simplex.

6. In a telephone system according to claim 5, a signaling circuit comprising a non-talking conductor of the selector through which two lines are connected for repeating signals from a signal receiving relay of one line to a signal sending relay of the calling one of said two lines.

7. In a telephone system, a calling line, outgoing lines, means including a selector for connecting said calling line to any one of said outgoing lines, a signal receiving relay for said calling line, a line relay for said selector, a simplex circuit comprising the talking conductors leading to said selector for repeating signals from said signal receiving relay to said line relay, transmission pads and a pad control relay associated with said calling line, and resistors associated with said calling line included in said simplex circuit one in each branch, said pad control relay being connected across said resistors and across the conductors of said simplex circuit, said simplex circuit being balanced to prevent the operation of said pad control relay.

8. In a telephone system, a calling line, transmission pads and a pad control relay associated with said calling line, a trunk, a pad control relay for said trunk, means for connecting said calling line with said trunk, a line relay for said trunk, signal receiving and signal sending relays associated with said line, a simplex signaling circuit comprising the talking conductors leading to said trunk for repeating signals from a signal receiving relay of said line to the line relay of said trunk, resistors associated with said calling line, resistors associated with said trunk, one of the resistors of the line and one of the resistors of the trunk included in one branch of the simplex circuit, another of the resistors of the line and another of the resistors of the trunk included in the other branch of the simplex circuit, the pad control relay of the line bridged across the resistors at one end of the simplex and the pad control relay of said trunk bridged across the resistors at the other end of the simplex, said simplex being balanced to prevent the operation of said pad control relays.

9. In a telephone system according to claim 8, other lines, means for connecting said trunk with a desired one of said other lines, and means for unbalancing said simplex to cause the operation of the pad control relay of said line, the last-mentioned means being operatively dependent upon the character of said other line with which said trunk is connected.

10. In a telephone system, a first office, a second office, an operator's position in said first office comprising a dial, a trunk between said offices, a jack at said position connected to said trunk, a cord at said position connected to said jack, signal receiving and signal sending relays associated with said trunk in each of said offices, means in said first office for connecting said dial to the signal sending relay in said first office, a switch in said second office, means for connecting said trunk to said switch, groups of trunks connected to the bank of said switch, a group of ring-down lines connected to the bank of said switch, said switch being selectively operated in response to dial impulses received by the signal receiving relay in said second office from the signal sending relay in the first office to select a desired group, means for automatically operating said switch to seize a trunk in a selected group, signaling means comprising a source of ringing current associated with each of said ring-down lines, and means associated with said selector and rendered operative upon selection of said group of ring-down lines for causing the operation of the signaling means associated with the seized one of said ring-down lines to transmit a ringing signal over said seized line for a predetermined interval of time.

11. In a telephone system according to claim 10, means associated with said selector and responsive to the release of the signal receiving relay in the second office for reoperating the signaling means associated with the seized one of said ring-down lines to again transmit a ringing signal over the seized line for said predetermined interval of time.

12. In a telephone system according to claim 10, transmission pads, pad control resistors and a pad control relay associated with said trunk in said second office, transmission pads, pad control resistors and a pad control relay associated with said seized ring-down line, a simplex pad control circuit, one branch of said simplex circuit including one of the pad control resistors of said trunk, one of the talking conductors of said switch and one of the pad control resistors of said ring-down line and the other branch of said simplex circuit including another of the pad control resistors of said trunk, another talking conductor of said switch and another pad control resistor of said ring-down line, the pad control relay of said trunk being bridged across the pad control resistors of said trunk and the pad control relay of said ring-down line being bridged across the pad control resistors of said ring-down line, said pad control resistors being such as to balance the simplex and prevent operation of said pad control relays.

13. In a telephone system according to claim 10, a supervisory relay associated with said selector, a circuit closed at the end of the predeterminal interval during which a ringing signal is transmitted over the seized ring-down line for operating said supervisory relay, the operation of said supervisory relay being effective to operate a signal sending relay associated with said trunk in said second office.

14. In a telephone system according to claim 10, a supervisory relay associated with said selector, a circuit closed at the end of the predetermined interval during which a ringing signal is transmitted over the seized ring-down line for operating said supervisory relay, the operation of said supervisory relay being effective to operate a signal sending relay associated with said trunk in said second office, and signal receiving means associated with said ring-down line in said second office for receiving signals incoming over said ring-down line, the operation of the signal receiving means associated with said ring-down line being effective to cause the momentary release of the supervisory relay associated with said selector, and the momentary release of said supervisory relay being effective to cause the momentary release of said signal sending relay associated with said trunk in the second office.

15. In a telephone system, a first office comprising an operator's position, a second office comprising a selector, a trunk between said offices connected to a jack at said position, a cord connected to said jack, a dial and a dial pilot lamp at said position, signal sending and signal receiving relays associated with said trunk in each of said offices, means comprising a dial key for operatively associating said dial with said trunk, the signal sending relay in said first office being operatively effective to repeat dial impulses created by the operation of said dial to the signal receiving relay in said second office, groups of trunks terminating in said second office, means comprising a selector in said second office controlled by said receiving relay for selecting a desired group of trunks, and means responsive to the selection of a particular one of said groups by said selector for operating the signal sending relay in said second office to transmit a signal to the signal receiving relay in said first office, and means controlled by the signal receiving relay in the first office for extinguishing said pilot lamp as a stop-dialing signal.

16. In a telephone system according to claim 15, means for automatically operating said selector to select and seize an idle trunk in a selected group, and means associated with each of said trunks in said particular group and rendered effective by seizure of the trunk for holding operated the signal sending relay in said second office to maintain the stop-dialing signal at said position.

17. In a telephone system according to claim 15, means for automatically operating said selector to select and seize an idle trunk in a selected group, and means associated with each of said trunks in said particular group and rendered effective by seizure of the trunk for holding operated the signal sending relay in said second office to maintain the stop-dialing signal at said position, impulse controlled means common to said particular group of trunks, means responsive to seizure of a trunk in said particular group for connecting said impulse controlled means to the seized trunk, and means associated with said seized trunk and responsive to the connection of said impulse controlled means to the seized trunk for causing the release of the signal sending relay in said second office to terminate the stop-dialing signal at said position.

18. In a telephone system according to claim 15, means for automatically operating said selector to select and seize an idle trunk in a selected group, and means associated with each of said trunks in said particular group and rendered effective by seizure of the trunk for holding operated the signal sending relay in said second office to maintain the stop-dialing signal at said position, selectors common to the trunks in said particular group, means for connecting an idle one of said selectors to a seized one of the trunks in said particular group, and means associated with each of the trunks in said particular group and operatively responsive to the connection of an idle one of said common selectors for causing the release of the signal sending relay in said second office to terminate the stop-dialing signal at said position.

19. In a telephone system, a calling manual office, an intermediate office comprising a selector switch, a called office, a first trunk and a second trunk, said first trunk connecting said manual and intermediate offices and said second trunk connecting said intermediate and called offices, an operator's position in said manual office, a dial at said position, means for connecting said dial to said first trunk, signal means operated respective to connection of said dial and first trunk, the operation of said signal means constituting a start-dialing signal, means comprising the selector in the intermediate office for connecting said first trunk to said second trunk, said selector being operatively controlled by said dial, and means responsive to connection of said first trunk to said second trunk for terminating the operation of said signal means as a stop-dialing signal.

20. In a telephone system according to claim 19, an impulse receiver, means effective upon connection of said first trunk to said second trunk for connecting said impulse receiver to said second trunk, and means responsive to connection of said impulse receiver to said second trunk for causing the reoperation of said signal means to indicate that said impulse receiver is attached to said second trunk and ready to receive dial impulses.

21. In a telephone system, an operator's position comprising a dial and a dial pilot lamp, an outgoing trunk, a cord at said position connected to said trunk, an impulse relay associated with said trunk, means for operatively connecting said dial to and through said cord to said impulse relay, the impulse relay being effective to repeat dial impulses over said trunk, means effective upon connection of said dial and said impulse relay to light said lamp as a start dial signal, a called subscriber's line, means comprising a switch operatively controlled by the impulses transmitted over said trunk for establishing a connection between said trunk and said line, an answering supervisory relay associated with said trunk at the calling end, means operatively responsive to the answer of the called subscriber for operating said supervisory relay, and means controlled by said supervisory relay for extinguishing said dial pilot lamp as an answering signal.

22. In a telephone system, a trunk, a line, means including a selector and an access circuit connected in tandem in the order named for routing a connection from said trunk to said line, said connection comprising one or more conductors defining a control path extending between said selector and said access circuit, means included in said access circuit and controlled over said path from said selector for controlling the application of ringing voltage to said line, and means included in said selector and controlled over said path from said access circuit for controlling the transmission of supervisory signals over said trunk.

23. In a telephone system, a trunk, a line, means including a selector and an access circuit connected in tandem in the order named for routing a connection from said trunk to said line, said connection comprising a pair of conductors defining a communication channel and a third conductor defining a control path extending between said selector and said access circuit, means included in said access circuit and controlled over said path from said selector for controlling the application of ringing voltage to said line, and means included in said selector and controlled over said path from said access circuit for controlling the transmission of supervisory signals over said trunk.

24. In a telephone system, a trunk, a line, means including a selector and an access circuit connected in tandem in the order named for routing a connection from said trunk to said line, said connection comprising one or more conductors defining a control path extending between said selector and said access circuit, a ringing control relay included in said access circuit and operative to control the application of ringing voltage to said line, an operating circuit for said relay, said operating circuit including said control path, means operative in response to the operation of said selector to seize said access circuit for completing said operating circuit for a limited time interval, and means included in said selector and controlled from said access circuit over said control path for controlling the transmission of supervisory signals over said trunk.

25. In a telephone system, a trunk, a line, means including a selector and an access circuit connected in tandem in the order named for routing a connection from said trunk to said line, said connection comprising one or more conductors defining a control path extending between said selector and said access circuit, a ringing control relay included in said access circuit and operative to control the application of ringing voltage to said line, an operating circuit for said relay, said operating circuit including said control path, a timing device, means operative in response to the operation of said selector to seize said access circuit for completing said operating circuit and for initiating the operation of said timing device, means controlled by said timing device for opening said operating circuit a predetermined time interval after it is completed, and means included in said selector and controlled from said access circuit over said control path for controlling the transmission of supervisory signals over said trunk.

26. In a telephone system, a trunk, a line, means including a selector and an access circuit connected in tandem in the order named for routing a connection from said trunk to said line, said connection comprising one or more conductors defining a control path extending between said selector and said access circuit, a ringing control relay included in said access circuit and operative to control the application of ringing voltage to said line, an operating circuit for said relay, said operating circuit including said control path, a timing device, means operative in response to the operation of said selector to seize said access circuit for completing said operating circuit and for initiating the operation of said timing device, means controlled by said timing device for opening said operating circuit a predetermined time interval after it is completed and for arresting the operation of said timing device, means controllable over said trunk for recompleting said operating circuit and for reinitiating the operation of said timing device, whereby said operating circuit is held completed for a second predetermined time interval, and means included in said selector and controlled over said path from said access circuit for controlling the transmisison of supervisory signals over said trunk.

RALPH E. KING.
OHMER R. MILLER.